United States Patent

Nostwick

[19]

[11] Patent Number: 6,075,326
[45] Date of Patent: Jun. 13, 2000

[54] HIGH INTENSITY DISCHARGE LAMP BALLAST AND LIGHTING SYSTEM

[76] Inventor: Allan A. Nostwick, 4625 N. 615th West, Huntington, Ind. 46750

[21] Appl. No.: 09/062,974

[22] Filed: Apr. 20, 1998

[51] Int. Cl.[7] ....................................................... G05F 1/00
[52] U.S. Cl. ............................ 315/307; 315/224; 315/291
[58] Field of Search ..................................... 315/307, 291, 315/224, 209 R, DIG. 7

[56] References Cited

U.S. PATENT DOCUMENTS

| | | | |
|---|---|---|---|
| 5,103,143 | 4/1992 | Daub ........................................ | 315/307 |
| 5,212,428 | 5/1993 | Sasaki et al. ............................ | 315/307 |
| 5,481,162 | 1/1996 | Boenigk et al. ......................... | 315/307 |
| 5,481,163 | 1/1996 | Nakamura et al. ...................... | 315/307 |
| 5,485,061 | 1/1996 | Ukita et al. .............................. | 315/307 |
| 5,600,211 | 2/1997 | Luger ....................................... | 315/307 |

*Primary Examiner*—David H. Vu
*Assistant Examiner*—Wilson Lee
*Attorney, Agent, or Firm*—Harold Levine, P.C.

[57] ABSTRACT

A versatile ballast and method of controlling and operating a high intensity discharge lamp. Lamp ignitor circuitry provides a high frequency alternating current starting voltage that is at least several times the nominal operating voltage of the lamp, thus shortening the starting time. This starting voltage is applied in series with normal operating voltage. After sustained ignition of the lamp has begun and a substantial lamp arc current has developed, the relatively low current supply characteristic of the alternating current starting voltage results in its becoming relatively insignificant. As lamp startup proceeds, the internal arc voltage typically falls to a fraction of its steady-state value; and circuit provision is made to correspondingly change applied current so as to maintain an essentially constant wattage operating power input to the lamp as the arc voltage changes. This automatic control of current also compensates for changes that occur in lamp characteristics as the lamp ages. In addition to the foregoing, provision is also made for adjusting the level of constant power input so as to provide for dimming and also to set the desired constant power level at any desired value over a wide range of from about 10 to 100 percent of lamp rated power.

60 Claims, 11 Drawing Sheets

HIGH INTENSITY DISCHARGE LAMP BALLAST AND LIGHTING SYSTEM

This invention relates to lighting systems and more particularly to starting, monitoring and controlling operation of high intensity discharge lamps.

BACKGROUND OF THE INVENTION

High intensity discharge lamps (hereinafter HID lamps) are often employed where high levels of relatively efficient lighting are needed; as, for example, in sports stadiums, along freeways and the like. An example of such lamps is the high efficiency metal halide HID lamp typically employing a mixture of noble gases including xenon and argon, plus mercury vapor, and a variety of metal halide vapors which are blended to obtain greater output and improved spectral content in the light produced by the lamp, such gases typically being under pressure within a transparent (e.g., quartz envelope). Examples are those which are generally available from Venture Lighting Company under designators MPDC48/C/BU and MPDC68/C/BU. Other examples are high pressure sodium and mercury vapor lamps.

Although such lamps efficiently provide high levels of light output per unit of input electrical energy, they typically exhibit characteristics that complicate and/or discourage their use and control. Thus, for example, such lamps tend to exhibit unstable arc voltages, especially when operated at low power levels. In addition, such lamps tend to fail violently at the ends of their lives, such failure being attributable to arc voltage (and consequently power in conventional systems) that tend to increase throughout the useful lives of the lamps, thus leading to corresponding increases in dissipated power, excessive temperature and internal pressure. Still other problems include:

1. Differing characteristics exhibited by nominally similar lamps;
2. Coordinating control of multiple lamps;
3. Starting and re-starting lamps when cold, warm or hot;
4. Maintaining light output at selected levels;
5. Satisfactorily dimming arc lamps while maintaining stability; and
6. Excessive time required for starting.

A variety of proposals have heretofore been made for controlling gaseous discharge high efficiency lamps, illustrative of which are those set forth in U.S. Pat. No. 5,623,187 to Paulo Caldeira et al.; U.S. Pat. No. 5,589,742 to Hiroyuki Ueda; U.S. Pat. No. 5,550,434 to Kenneth J. King et al; U.S. Pat. Nos. 5,036,256, 5,051,665, and 5,391,966 to Robert L. Garrison; and U.S. Pat. No. 5,523,656 to Meerten Luursema. Although the proposals of these and other patents have addressed selected ones of the foregoing characteristics, there yet remain unresolved drawbacks to their use. Thus, for example, among other problems, there have continued to be problems with excessive starting time, re-starting while a lamp is still hot and before it has cooled to ambient temperature, the aforementioned inherent arc instability and build-up of arc voltage as lamps age.

Although various of the foregoing problems have been partly addressed by prior proposals, there has yet continued to be a need for a comprehensive arc discharge lamp control system that provides solutions to each of the foregoing difficulties, and while other prior patents make reference to various constant wattage calculating and regulating functions, none that are known to the inventor hereof reveal a specific, workable, circuit topology for achieving such power calculation.

BRIEF SUMMARY OF THE INVENTION

The improved system according to the invention hereof includes multiple features that ameliorate adverse conditions and characteristics heretofore associated with prior use and conditions. Thus, in accordance with the preferred embodiment hereof, three circuits are combined to supply: (1) a relatively high voltage and frequency alternating current for rapid lamp starting followed by (2) A boosted dc voltage with limited current capability, and (3) provision of a controlled arc-sustaining current whose value automatically changes as arc voltage changes so as to supply a lamp with a substantially constant wattage, the magnitude of which can be adjustably set over a range of from about 10 percent (or other higher or lower value of minium power that may be determined suitable for any given lamp type) to 100 percent of full light output.

OBJECTS AND FEATURES OF THE INVENTION

It is one general object of the invention to improve gaseous arc discharge lighting systems.

It is another object of the invention to facilitate control of arc lights.

It is yet another object of the invention to improve safety in use and to reduce likelihood of catastrophic failure of arc discharge lamps.

It is still another object of the invention to improve stability of operation of arc discharge lamps over a range of power levels.

It is still another object of the invention to extend the range of useful light output of arc discharge lamps.

It is yet another object of the invention to provide for warm stand-by operation of arc discharge lamps so as to facilitate their rapid return to normal illumination.

It is yet another object of the invention to reduce starting time for turning on an arc discharge lamp.

Accordingly, in accordance with one feature of the invention, a predetermined adjustable level of constant energy is applied to an arc discharge lamp at any selected level of visible illumination ranging from about 1 to 100 percent of rated lumen output (corresponding to about 10 to 100 percent of rated power), thus at least partly compensating for inherent lamp instability at low power levels.

In accordance with another feature of the invention, the aforementioned level of constant energy results in light level appearing essentially constant to a visual observer even though the lamp arc voltage may be changing over a considerable range as the lamp temperature slowly changes from an equilibrium value at one power level to a different equilibrium value at another power level following a change in programmed value.

In accordance with yet another feature of the invention, power level control is facilitated through provision of a simple analog control voltage, thus simplifying such control.

In accordance with still another feature of the invention, through automatic application of the aforementioned constant power control, lamps having significantly differing operating characteristics may be included a multi-lamp array while exhibiting substantially similar light outputs.

In accordance with yet another feature of the invention, by automatically providing constant power lamp input once a power level is set, adjustment of lamp current is automatically made to compensate for the increase of arc voltage as a lamp ages, thus markedly reducing the incidence of catastrophic failure of lamps as they age.

In accordance with a further feature of the invention, through provision of high frequency high starting voltage that is made automatically to become insignificant once normal arc current is established, starting time for cold starting or restarting from a warm/hot state is substantially reduced and facilitated.

In accordance with still a further feature of the invention, circuits for production of the aforementioned high frequency high starting voltage are interconnected serially with a source of normal arc sustaining power; and the high frequency high voltage generating mechanism is so configured that the production of starting voltage is greatly diminished when the loading effect of the reduced impedance of the lamp, after ignition has occurred, acts upon the source of the starting voltage, thus automatically rendering such starting voltage relatively insignificant during normal lamp operation.

In accordance with yet a further feature of the invention, provision is made for lamp operation in a low power stand-by mode from which transition to full or partial brilliancy can be promptly restored, thus facilitating energy conservation.

In accordance with still a further feature of the invention, sensing circuits monitor arc operation voltage, thus providing reliable indicators for control of circuits providing power to the lamp arc.

In accordance with still another feature of the invention, circuits are conditioned to respond to the aforementioned arc sensing circuits to control width of pulses supplied to power producing circuits, thus facilitating control and maintenance of constant power whose desired level can be adjusted over a wide range.

In accordance with yet one additional feature of the invention, circuits including those heretofore mentioned provide special starting, control and timing-sequencing to recognize and compensate for the three states in which the lamps may reside, namely, when a lamp is very hot shortly after it has been turned off; during an intermediate cooling period; and when a lamp is cold or has cooled sufficiently so that a normal starting sequence can be begun; thus addressing each of the states from which a lamp may be started. Accordingly, a very fast responding current source is provided a lamp.

In accordance with yet another feature of the invention, a second secondary, a second set of rectifiers, and a separate current limiting impedance is included in the circuit with its output following the output of, and connected in series with, the output of the principal rectifiers, thereby boosting the output voltage for starting the lamp and thus improving lamp starting characteristics.

In accordance with still another feature of the invention, current mode control is employed in the main power control circuits, thus facilitating overall lamp control and making use of the advantage inherent in current mode control in providing overload protection of the main switching power mosfet transistors.

These and other objects and features of the invention will be apparent from the following description, by way of example of a preferred embodiment, with reference to the drawing.

DESCRIPTION OF A PREFERRED EMBODIMENT

Before proceeding to a detailed description of the invention, some additional general information may be helpful.

Lamp Ignition; To improve lamp ignition, a relatively high frequency, high ignition starting voltage is applied as a continuous waveform during a starting period. Such starting voltage is essentially sinusoidal at a frequency of approximately 100 kilo-hertz, and with an amplitude lying in a range of about 1 to 3 kilo-volts RMS. This results in highly reliable and prompt ignition.

Figure 6:
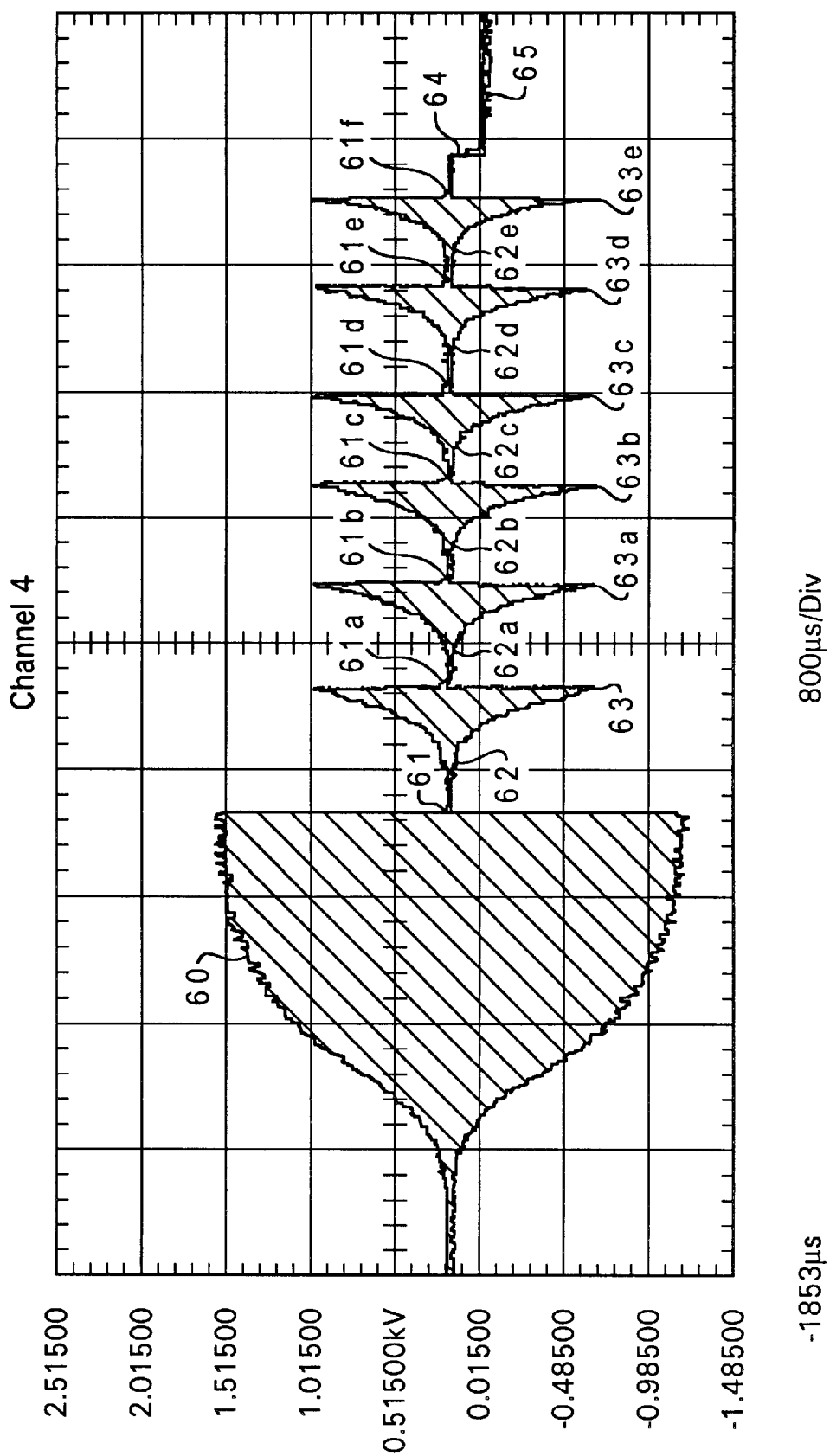
FIG. 6 is a graph illustrating reappearance of ignitor high voltage during startup before lamp current becomes sustained.

Oscilloscope observation of typical lamp terminal voltages reveals that some individual specimens of the HIV lamps exhibit a tendency to extinguish spontaneously soon after the initial arc current is started. The improved reliability of the starting method hereof appears due in part to the ability of the high voltage source to re-appear very quickly in the event that the lamp does extinguish as mentioned above, with the effect that lamp current is quickly restored following said extinguishment, before de-ionization has time to occur, and with the process being repeated as many times as necessary to achieve full lamp operation. This sequence, which occurs very quickly and is not apparent to a visual observer, is illustrated in FIG. 6. There, it will be observed is shown the initial build-up of ignitor voltage as represented by the initial envelope 60 which appears to collapse to point 61 when the lamp arc initially strikes. After a brief interval (as at point 62), the arc current tended to decrease and the ignitor circuits responded by developing increasing voltage to an amplitude represented by point 63, whereupon the arc was re-struck as represented by point 61*a*. The arc current had not as yet stabilized, and so as it declined again, the ignitor circuits again responded (as at point 62*a*) by developing increasing voltage to an amplitude represented by point 63*a*, whereupon the arc was again re-struck as represented by point 61*b*. This sequence continued (as mentioned above so rapidly that it was not apparent to the eye of an observer) until at point 61*f* the arc became sustained. Thereafter, at point 64, the voltage declined to a steady value as represented by trace 65 and as described in greater detail below.

The high frequency alternating current output of the high voltage source is connected in series with the main direct current output of the ballast, but operating conflict between AC and DC components is avoided due to the fact that the high frequency AC signal is immediately shunted to essentially zero volts by the relatively heavy loading provided by the lamp as soon as it begins to conduct, and since the output current capability of the high frequency circuit is strictly limited to a low value. The preferred circuits for the high frequency starting voltage are a single ended Hartley oscillator with a primary winding and a feedback winding on the coil where the high voltage secondary both supplies the high voltage and carries the main current of the lamp, effecting what is termed series injection of ignitor voltage.

Main output. The main output and the boost voltage supply together supply about 300 volts with the capability of providing sufficient current to cause the lamp to transition from the initial discharge, sometimes termed the glow mode, to the desired normal arc mode. For such transition to occur, sufficient current must be available at each value of lamp terminal voltage as the lamp transitions and its terminal voltage decreases. The final transition occurs when sufficient positive ions (ionized gas molecules from which electrons have been stripped) impact the lamp cathode, their kinetic energy raising the temperature of the cathode to a level where large numbers of free electrons are emitted thermionically.

The main supply circuits include a push-pull inverter that switches the input supply voltage alternately across each of the two halves of the primary of an output transformer. Control of the output is accomplished by pulse width modulation of the primary voltage, and by the use of an averaging inductor in the output of the secondary rectifiers. In the present illustrative embodiment, the input voltage is direct current at a nominal 24 volts. It should be noted, however, that the principles underlying the present invention are applicable to systems where the DC voltage is at other values.

For the circuits described herein, the foregoing open circuit value of about 300 volts is more than twice the steady state operating voltage of the lamp. For these circuits, the open circuit voltage is determined by the turns ratio of the output transformer, and when such turns ratio is chosen to provide sufficient open circuit voltage, there results a peak primary current that is more than twice that which would occur if the turns ratio were chosen just to provide the steady state operating voltage. This increased primary current causes a substantially greater power loss in the switching elements that must control the primary current. In the present instance these switching elements are power MOSFET transistors.

Boost voltage. To reduce power loss, a separate secondary and set of rectifiers is included, a current limiting inductive impedance is inserted between the secondary and the rectifiers, and the output of this second set of rectifiers is added in series with the output of the main rectifiers, thus providing the required open circuit voltage but with reduced burden on the switching transistors. The current limit value of the boost circuit is much lower than the normal operating current of the lamp, with the result that the boost circuit causes only a small increase in the current that must be carried by the switching transistors. In normal lamp operation, the output voltage of the boost section is essentially reduced to zero, and the output power of the ballast is provided by the main secondary. The details of this configuration will become clear in the detailed circuit description that follows.

Current control. One very important requirement of circuits powering an arc lamp is the ability to supply an appropriate value of current regardless of the variation in terminal voltage of the lamp. Of several control methods for pulse width modulation, one appears to be particularly desirable in that it exhibits the property of supplying an output that inherently tends to have a constant current characteristic, that being the one known as current mode control. In practicing this method, current passing through the switching transistors is continuously monitored, and the termination of each pulse is caused to occur when the instantaneous value of pulse current reaches a predetermined value, where that value is itself caused to be adjusted by a sensing circuit that responds to variations in the final output of the system. The termination of current pulses at the preset current level occurs very quickly, whereas the adjustment of the current level at which pulse termination is caused to occur will in general have a much slower response. According to the present method, the adjustment of pulse termination current level is made in response to the current passing through the lamp load, sensed as a voltage appearing across a resistor connected in series with that load. A differential amplifier that is part of the pulse width control integrated circuit UC3846 (FIG. 3) compares the lamp current sense value with a reference value, and adjusts the pulse termination current level to make the current sense value remain essentially equal to the reference value. Thus the lamp current is stabilized insofar as long term variations are concerned.

Additional current regulation advantageously utilized is the property of the output inductor to maintain a nearly constant current during very rapid lamp voltage changes. Thus, control of a lamp according to the principles hereof include three mechanisms: (1) the current leveling property of the inductor for very short time variations; (2) a constant current property of the current mode control which is effective for intermediate time periods; and (3) the adjustment of pulse termination current level in response to the average lamp current, this third mechanism being responsible for accurately maintaining lamp current at its programmed value over extended intervals of time. The total effect is not unlike that of having a high voltage constant voltage supply with a large series resistor feeding the lamp, but without the unacceptable power loss inherent in such an arrangement.

Overall circuit control. As mentioned above, challenging properties of many high intensity arc discharge lamps have been observed. The starting characteristics of such lamps are very different depending on their temperatures when an attempt to start is made. This usually is a function of the length of time that has elapsed since the lamp was previously operated. If the lamp is quite hot, as during the first few seconds after being extinguished, the internal pressure is high which raises the breakdown voltage requirement, and the normal high voltage from the ignitor will not cause breakdown. As the lamp cools, there occurs an intermediate stage in which the ignitor high voltage causes streamers of glow discharge to pass through the lamp, but transition to full arc mode does not occur. Finally, when the lamp has cooled for a longer time, e.g., on the order of a minute, a normal ignition sequence can be obtained. Some lamps also exhibit a characteristic such that if, during the second (intermediate) stage described above, the high frequency glow discharge were maintained for an extended time, the lamp might continue in the non-transition mode, and the glow discharge might continue indefinitely. It could also happen in some situations that the lamp would appear to transition to arc mode, but would then spontaneously extinguish, and would then be caused to re-enter glow mode by the operation of the ignitor circuit, but would then fail to transition to arc mode operation. To avoid lengthy operation in such spurious modes, which could result in deleterious effects upon the lamp in question and cause unnecessary usage of energy from the primary supply system, special control and timing of starting events are provided herein.

Timing sequence. The following description assumes a clock frequency of 50 hertz. The preferred timing sequence is as follows:

1. A starting control command is issued by a low level control input, or connection is made to the main system voltage supply. Upon either such occurrence, the main output inverter starts, and a timing interval count begins.

2. After approximately a one half second delay, high voltage ignitor operation starts, and the setting for output power to the lamp is adjusted to near full rated power.
3. After about 5 seconds, ignitor operation is terminated, and power setting is restored to whatever value is being requested by the analog dimming control input. If normal lamp arc current is detected, timing operations pause. If lamp arc current is not established, the timing sequence continues.
4. After 5 additional seconds, main output current supply to the lamp is turned off.
5. After a one minute and 20 second delay, the above sequence is repeated.
6. If after 4 attempts to start in the above sequence, lamp operation is not yet established, the circuits lock in a waiting mode with all outputs off. The starting sequence can be re-initiated by cycling the low level control input, or the main system input power, off and on again. Current draw from the input power bus (main input supply to the system) is reduced during the waiting mode to a low value, about 8 milliamps from (for example) a 24 volt D C supply.
7. A starting sequence preferably is automatically initiated whenever input power is applied. In addition, provision is made for acceptance of a low voltage low level control signal from, for example, a logic controller. Current draw from the input main system power bus is only about 5 milliamperes when system input power is on and the low level control input is at off.
8. In the event that a lamp extinguishes for any reason while in normal operation, the clock stop signal will go low in response to the loss of sensed lamp current. This permits the timer clock to begin again producing pulses, which causes the state of the timer counter to resume advancing from whatever point it had previously stopped. The normal sequence of start attempts, as described in the preceding items number one through five, is then performed until either the lamp starts and runs normally, or the total number of start attempts since the last previous system start-up or reset reaches the limiting number four, whereupon the system locks up in a waiting state as described above in item number six.

The above timing sequence is preferably implemented with CMOS logic integrated circuits and peripheral sensing and control logic functions as shown in the drawings and described in the following sections.

System control signal inputs. Two control signal inputs are accepted by the system. One signal, herein designated the Operation Control Signal, causes the lamp to be turned completely on or off. The second signal, designated the Dimming Control Signal, causes the power in watts that is supplied to the lamp, to be varied over a wide range.

DETAILED DESCRIPTION

Figure 1A:
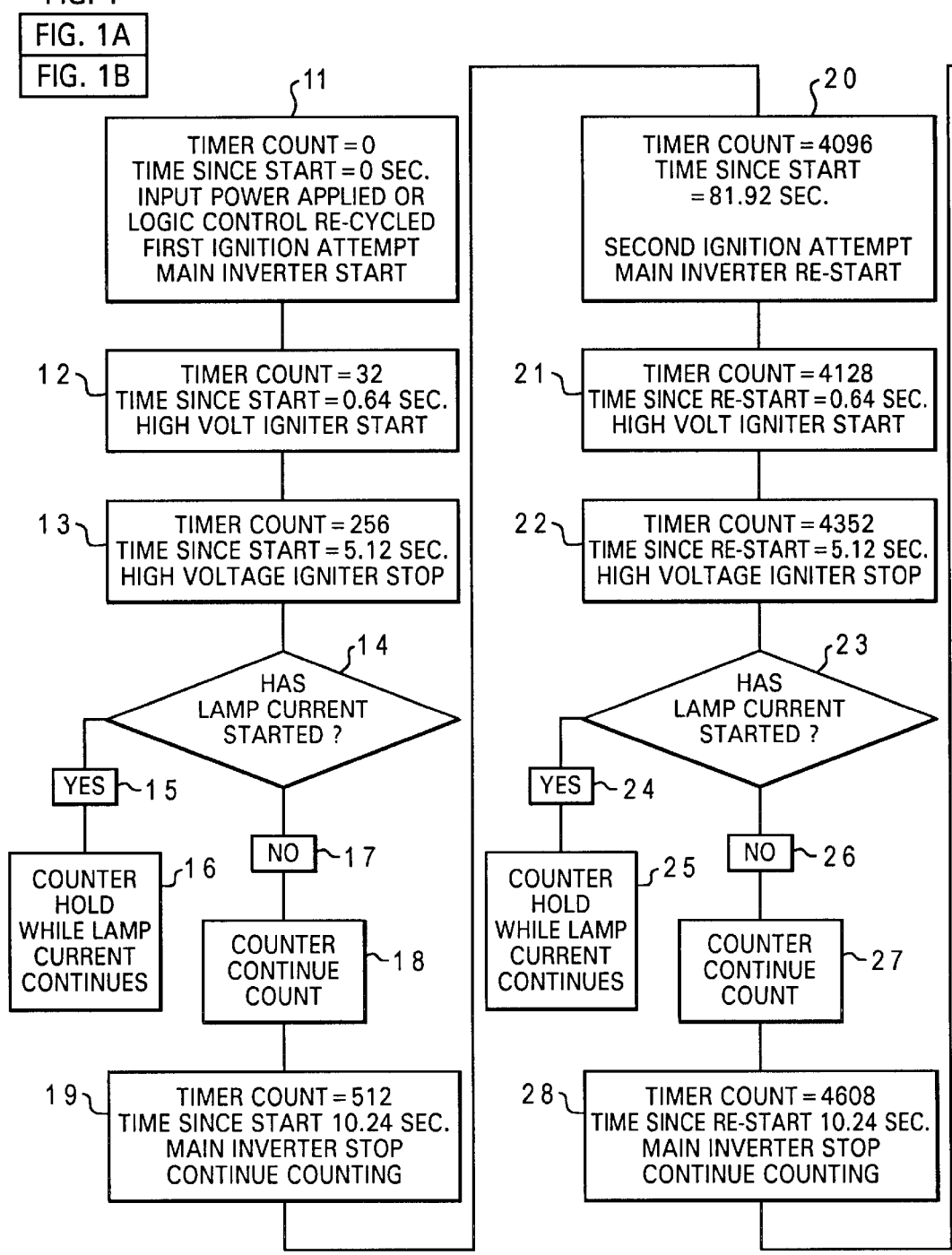
FIG. 1 is a flow diagram illustrating the lamp starting sequence of the system according to the invention.
Figure 1B:
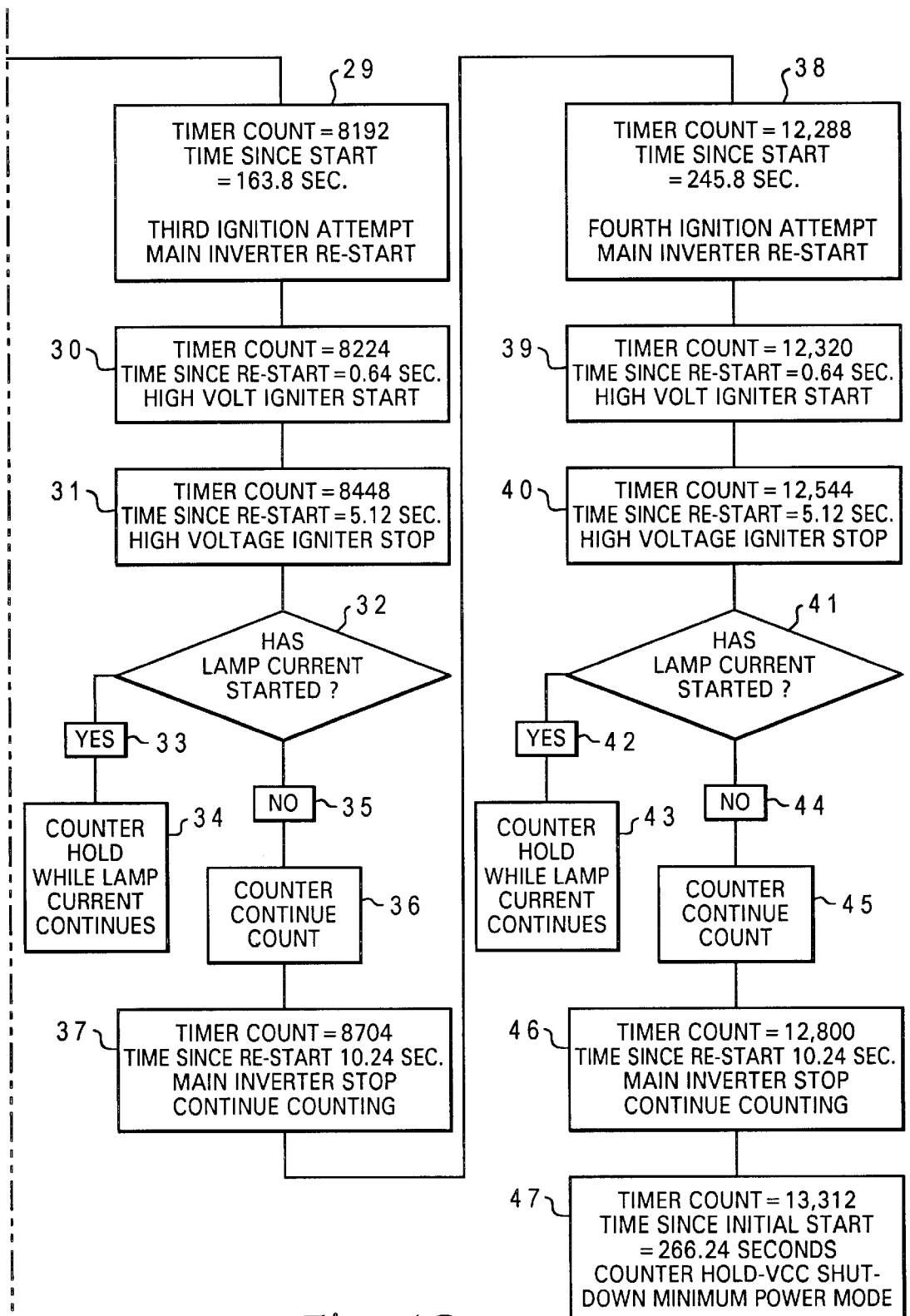

Now turning to the drawing, and more particularly FIG. 1 thereof, it will be seen to be a flow diagram illustrating operation of the system according to the invention. It depicts a sequence of operations performed by the system as it carries out its methods of lamp supervision and control according to the invention.

As will be observed from reference to FIG. 1, operations begin with the occurrence of either of two events as enumerated in the first block 11. These two events are: Input power applied to the system; or Logic control re-cycled. At this point, the subsequently described timer begins counting. At timer count 32, high voltage ignition is begun as depicted at block 12. Such high voltage ignition continues for a predetermined period of time until either ignition occurs or a time interval of 5.12 seconds has elapsed as illustrated at blocks 13 and 19. The circuits sense whether or not lamp arc has been struck and arc current is flowing. This is illustrated by logic symbol 14 "Has lamp current started?" If the circuits sense that lamp current (that is, arc current) has started as represented by "yes" block 15, counting is halted as represented by block 16. On the other hand, if arc current does not start within the aforementioned 5.12 second time interval as represented by "no" block 17, the counter continues to count (block 18) until the count reaches 512 (block 19) at which time the main inverter circuits that supply lamp arc current are de-activated but the counter continues to count.

When 81.92 seconds have elapsed since operations began (illustrated by block 20) and the count has reached 4096, a second ignition attempt is made. This includes re-activation of the aforementioned main inverter that supplies lamp arc current. At a count of 4128, re-application of ignition high voltage occurs (block 21). When 5.12 seconds have elapsed since initiation of the second start attempt (block 22), the circuits perform a second logical sequence similar to that described above with respect to logic symbol 14. Thus, as represented by logic symbol 23 "Has lamp current started?" the circuits sense whether or not lamp arc has been struck and arc current is flowing. If the circuits sense that lamp current (that is, arc current) has started as represented by "yes" block 24, counting is halted as represented by block 25. On the other hand, if arc current does not start within the aforementioned 5.12 second time interval as represented by "no" block 26, the counter continues to count (block 27)until the count reaches 4608 (block 28) at which time the main inverter circuits that supply lamp arc current are deactivated but the counter continues to count.

When 163.8 seconds have elapsed since operations began (illustrated by block 29) and the count has reached 8192, a third ignition attempt is made. This includes re-activation of the aforementioned main inverter that supplies lamp arc current. At a count of 8224, re-application of ignition high voltage occurs (block 30). When 5.12 seconds have elapsed since initiation of the third start attempt (block 31), the circuits perform a third logical sequence similar to that described above with respect to logic symbols 14 and 23. Thus, as represented by logic symbol 32 "Has lamp current started?" the circuits sense whether or not lamp arc has been struck and arc current is flowing. If the circuits sense that lamp current (that is, arc current) has started as represented by "yes" block 33, counting is halted as represented by block 34. On the other hand, if arc current does not start within the aforementioned 5.12 second time interval as represented by "no" block 35, the counter continues to count (block 36) until the count reaches 8704 (block 37) at which time the main inverter circuits that supply lamp arc current are de-activated but the counter continues to count.

When 245.8 seconds have elapsed since operations began (illustrated by block 38) and the count has reached 12,288, a fourth ignition attempt is made. This includes re-activation of the aforementioned main inverter that supplies lamp arc current. At a count of 12,320, re-application of ignition high voltage occurs (block 39). When 5.12 seconds have elapsed since initiation of the fourth start attempt (block 40), the circuits perform a fourth logical sequence similar to those described above with respect to logic symbols 14, 23 and 32. Thus, as represented by logic symbol 41 "Has lamp current started?" the circuits sense whether or not lamp arc has been struck and arc current is flowing. If the circuits sense that lamp current (that is, arc current) has started as represented by "yes" block 42, counting is halted as represented by block 43. On the other hand, if arc current does not start within the aforementioned 5.12 second time interval as represented by "no" block 44, the counter continues to count (block 45) until the count reaches 12,800 (block 46) at which time the main inverter circuits that supply lamp arc current are de-activated but the counter continues to count.

When the count reaches 13,312 (block 47) at 266.24 seconds since operations began, the count stops and the circuits are put on hold in which they enter a low power drain mode pending occurrence of either of the two events set forth above, namely: Input power is interrupted and re-applied to the system; or the operation control circuits are re-cycled.

As mentioned above, FIG. 2 is a graph illustrating typical starting voltage characteristics of a metal halide lamp representative of the type for which the circuits hereof are intended. There, it will be observed, is shown the high frequency, high voltage ignitor voltage waveforms 50 which, as described in connection with FIG. 1 begin at about 0.64 seconds after one of the events described in connection with block 11 of FIG. 1 occurs. For purposes of illustration in FIG. 2, that initial time period of 0.64 seconds is not shown, the 0 microsecond point 51 marking an arbitrary point (block 12 of FIG. 1) at which the high frequency high starting voltage has already been applied.

Figure 2:
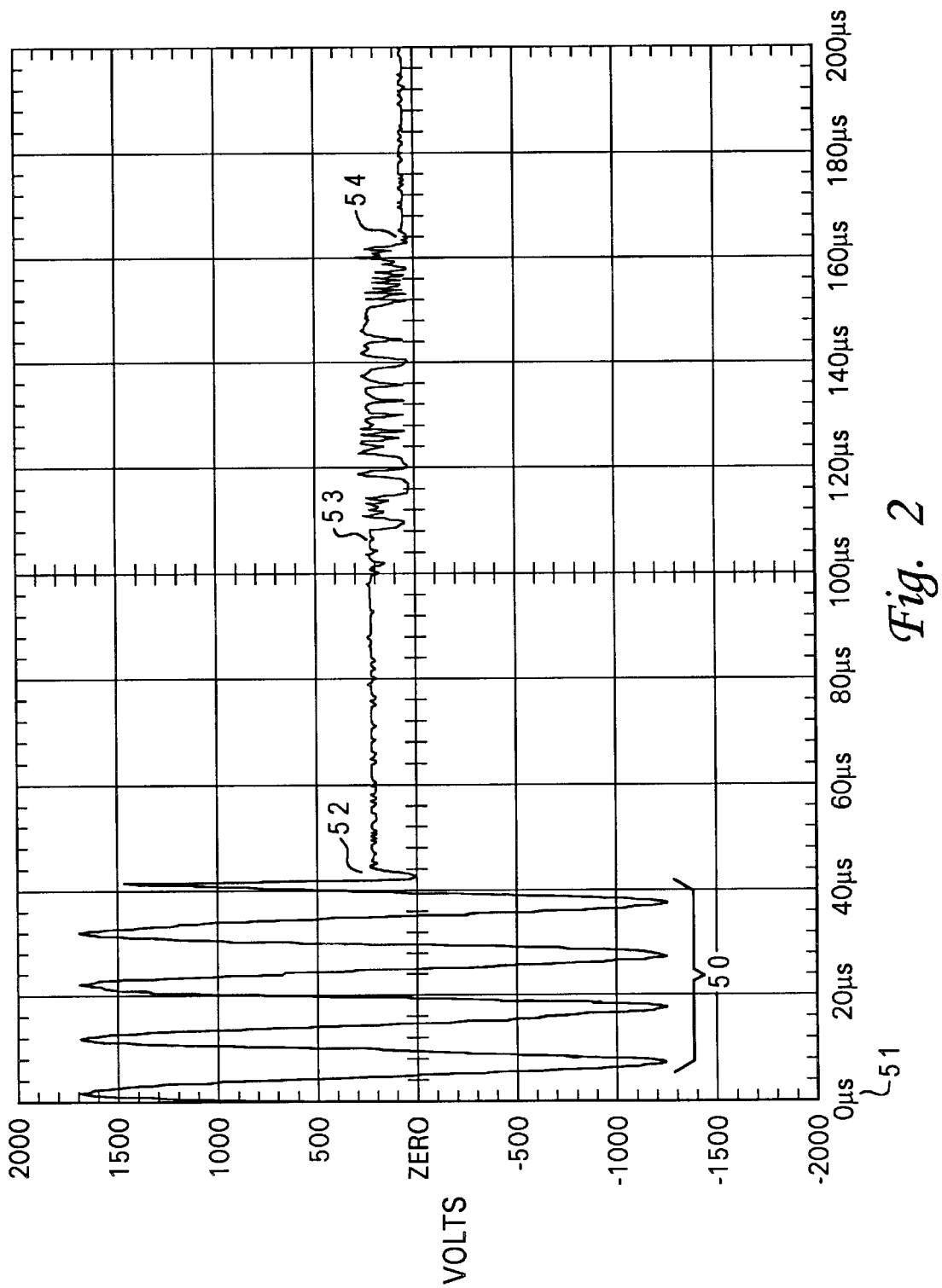
FIG. 2 is a graph illustrating typical ballast output voltage characteristics when loaded by a metal halide lamp representative of the type for which the circuits hereof are intended.

The graph of FIG. 2 is a reproduction of an actual oscilloscopic observation made of a high intensity discharge lamp showing the terminal voltage across the lamp during starting. After the initial five cycles of high voltage 50 which are the last part of a considerably longer interval of similar cycles that are not shown, the lamp enters a period during which its internal resistance markedly drops as it enters a glow discharge phase extending from point 52 to point 53 where it enters a state of sporadic arcing until it arrives at point 54 where it enters a stable arc discharge state as represented by a reduction thereafter in voltage to about 50 volts.

Although the glow discharge period of the observed lamp extends for roughly 100 microseconds, it should be noted that many lamps do not reside in a glow discharge state nearly as long. However, as described herein, the characteristics of the starting and operating current voltage sources is such as automatically to compensate for variances in glow discharge times within normally encountered ranges.

Figure 3A:
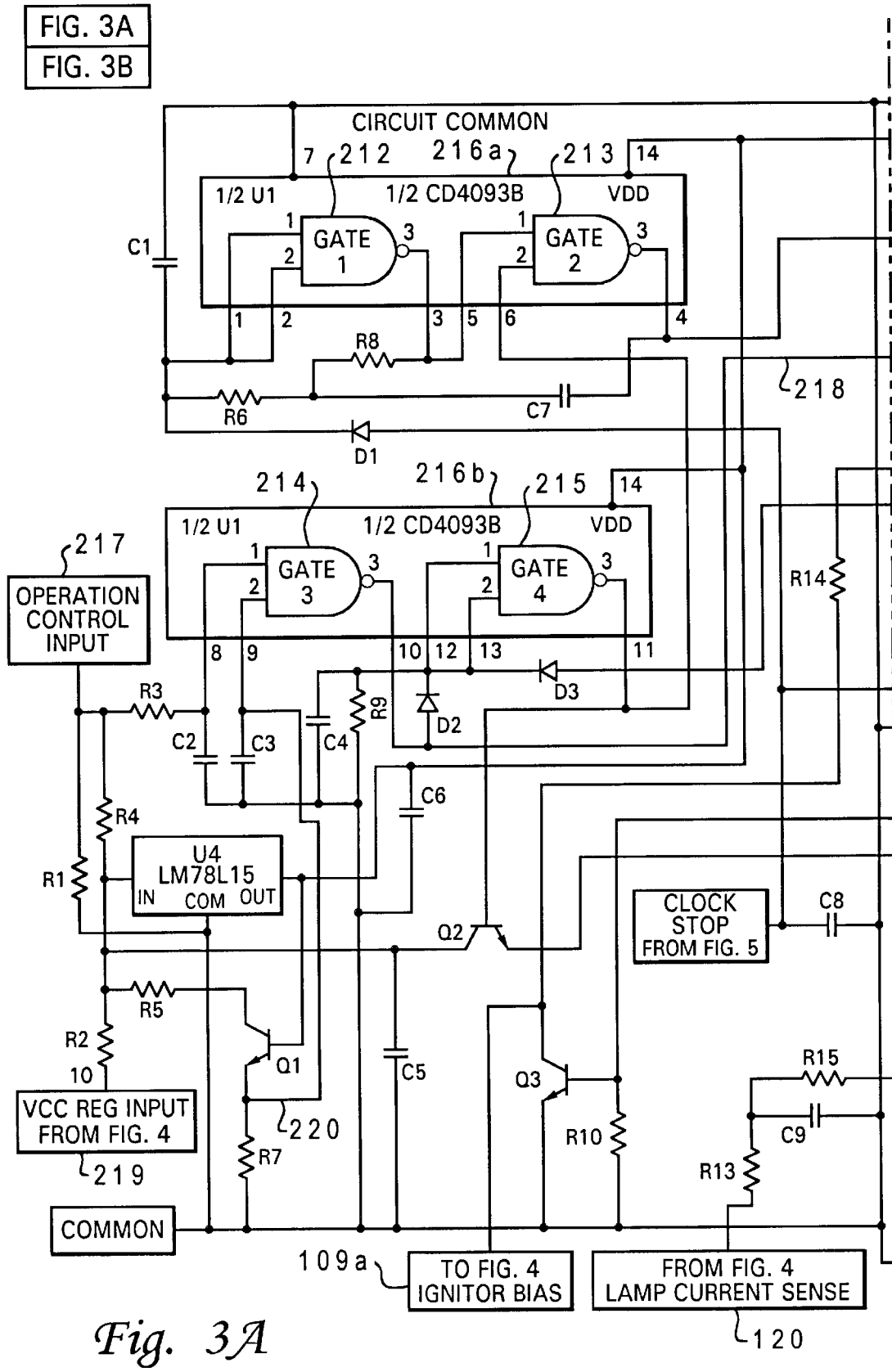
FIGS. 3, 4 and 5 together form a schematic diagram of circuits depicting the best mode known for carrying out the invention hereof.
Figure 3B:
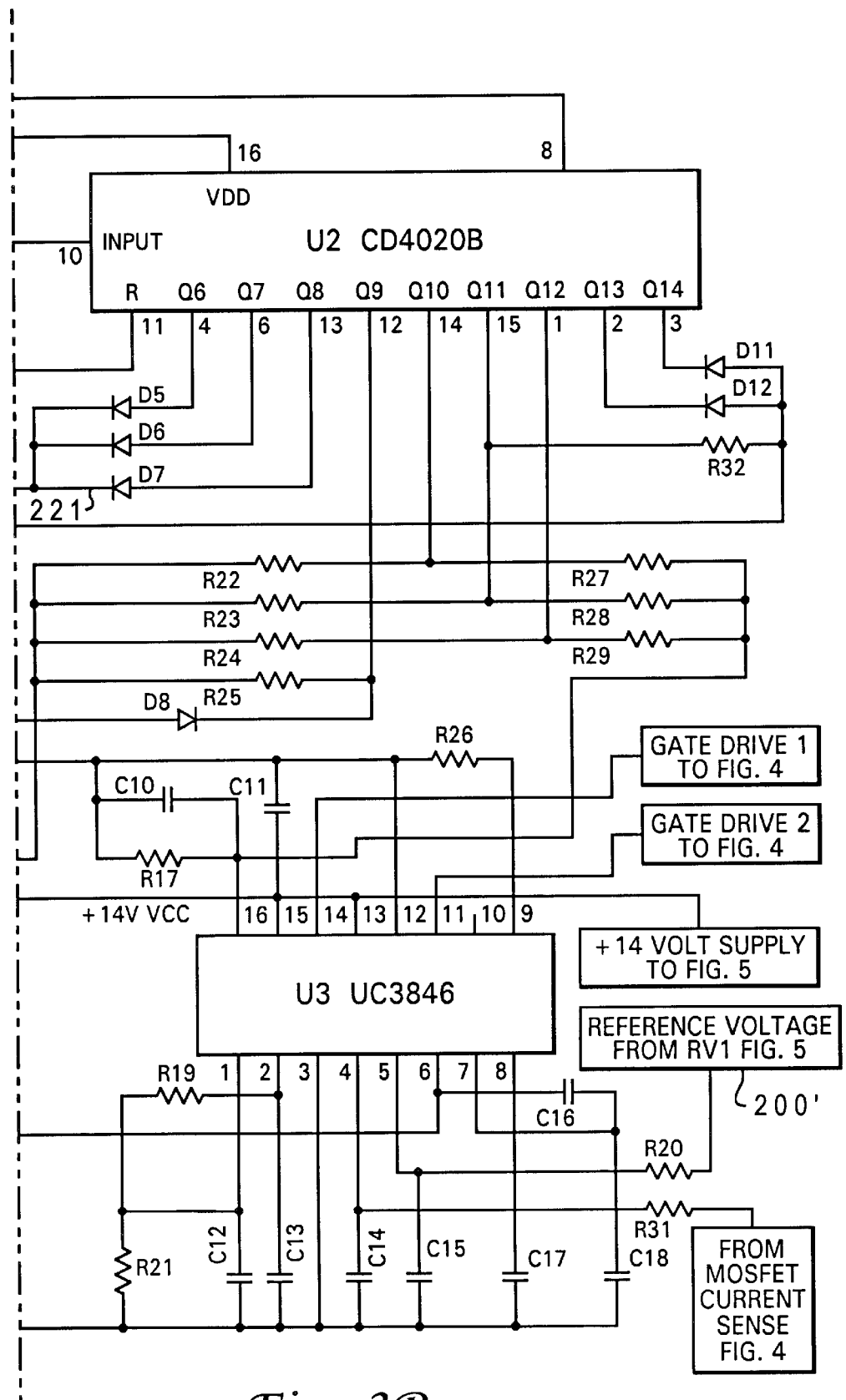
Figure 4A:
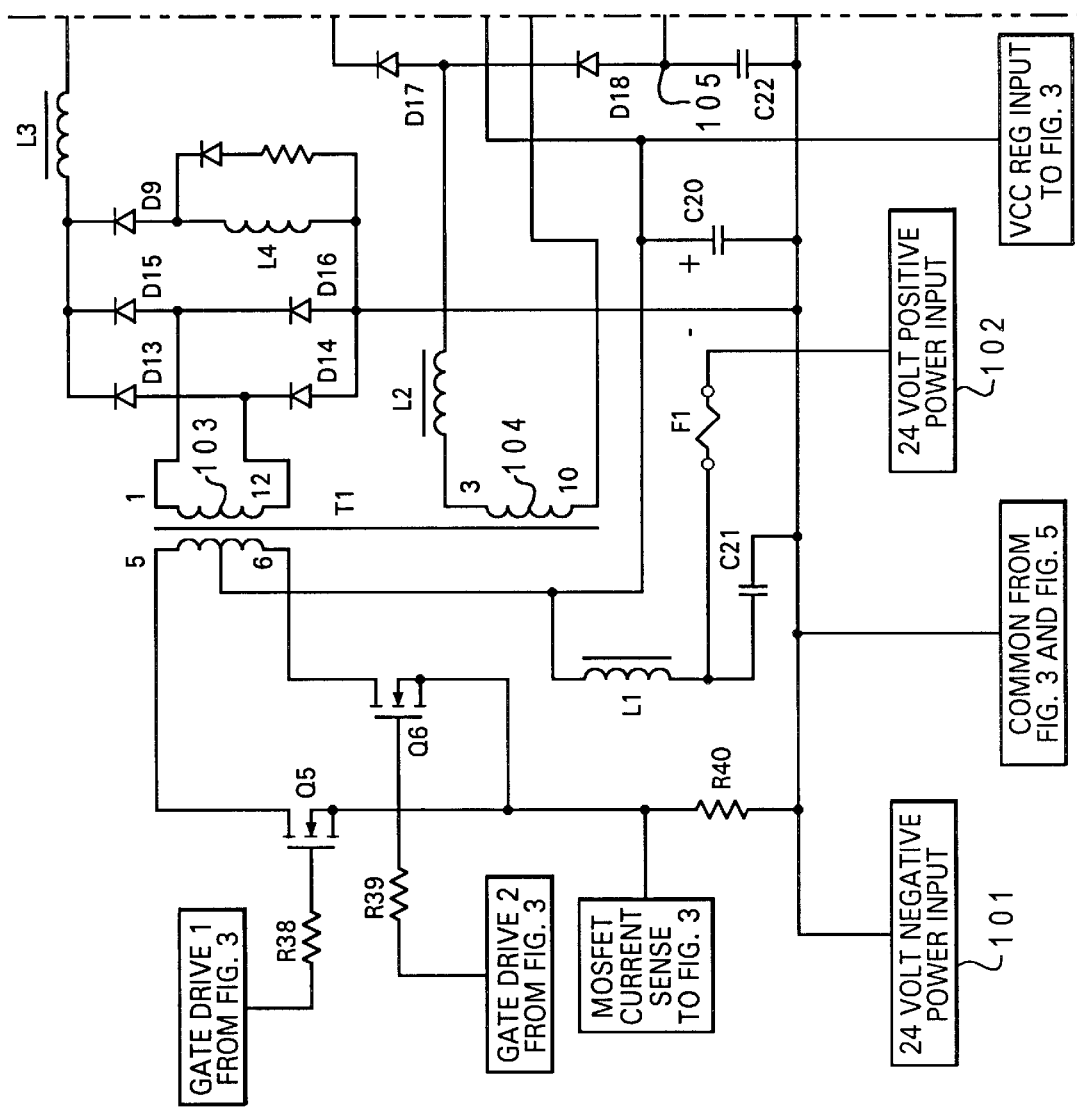
Figure 4B:
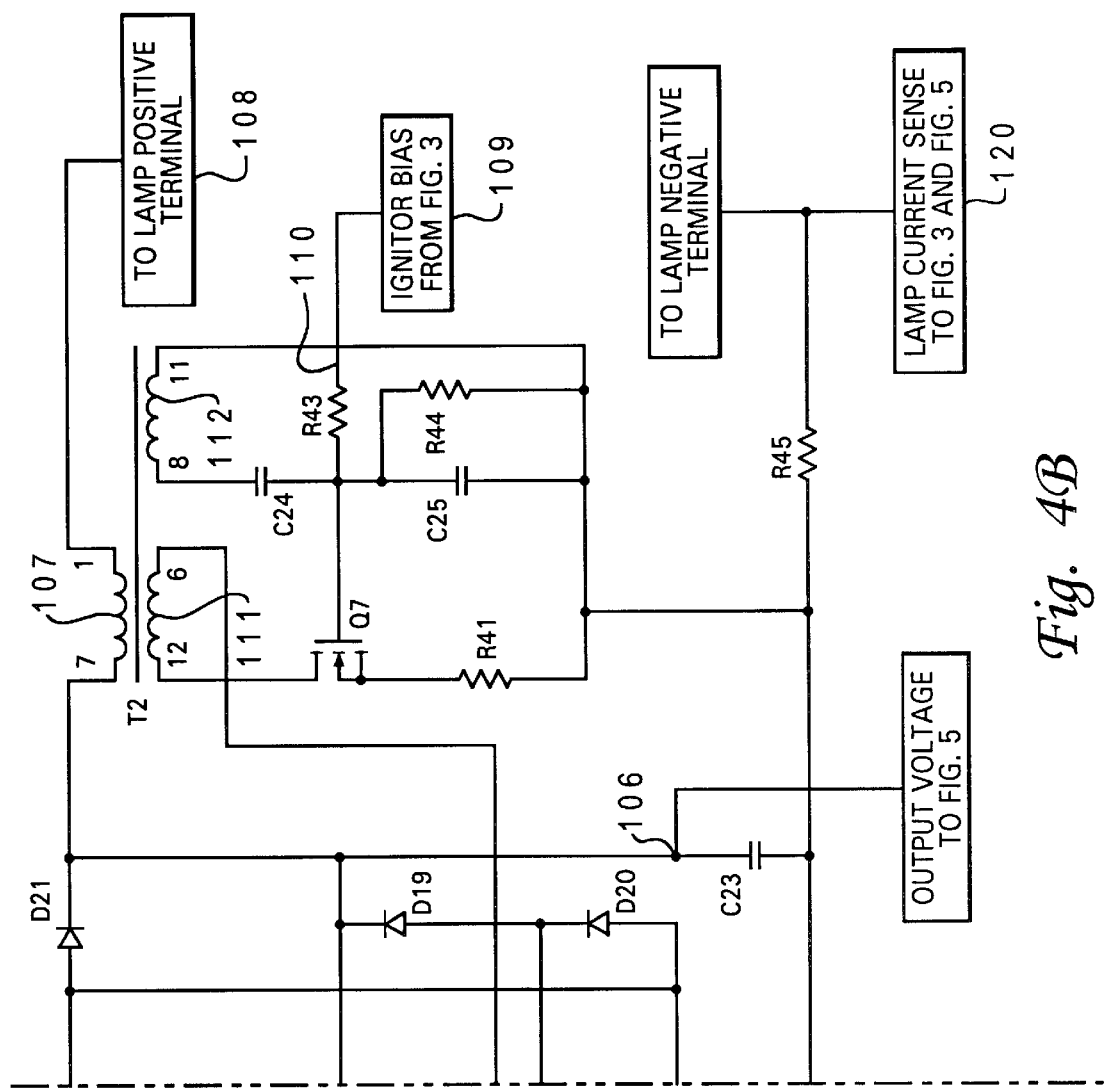
Figure 5A:
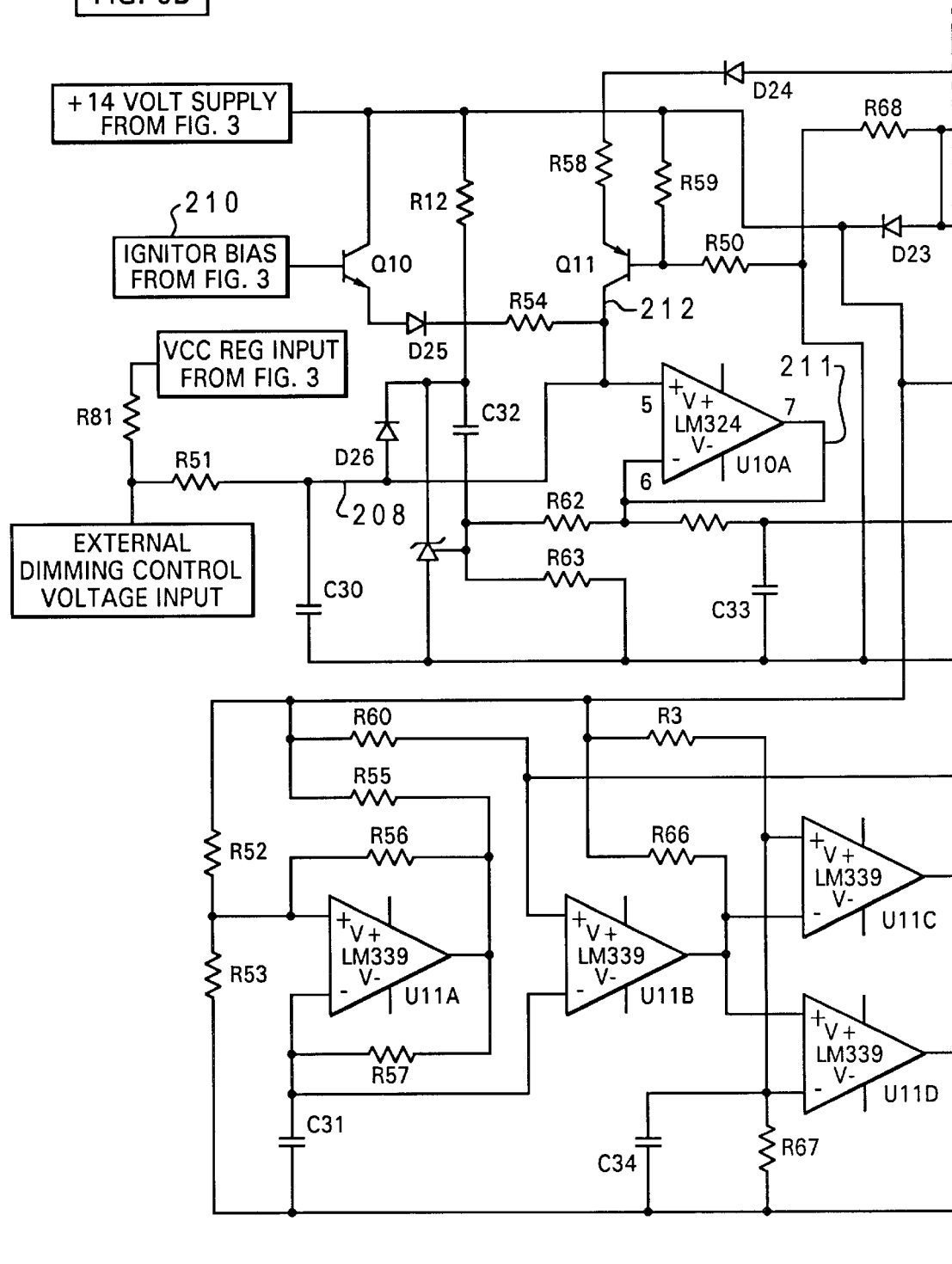
Figure 5B:
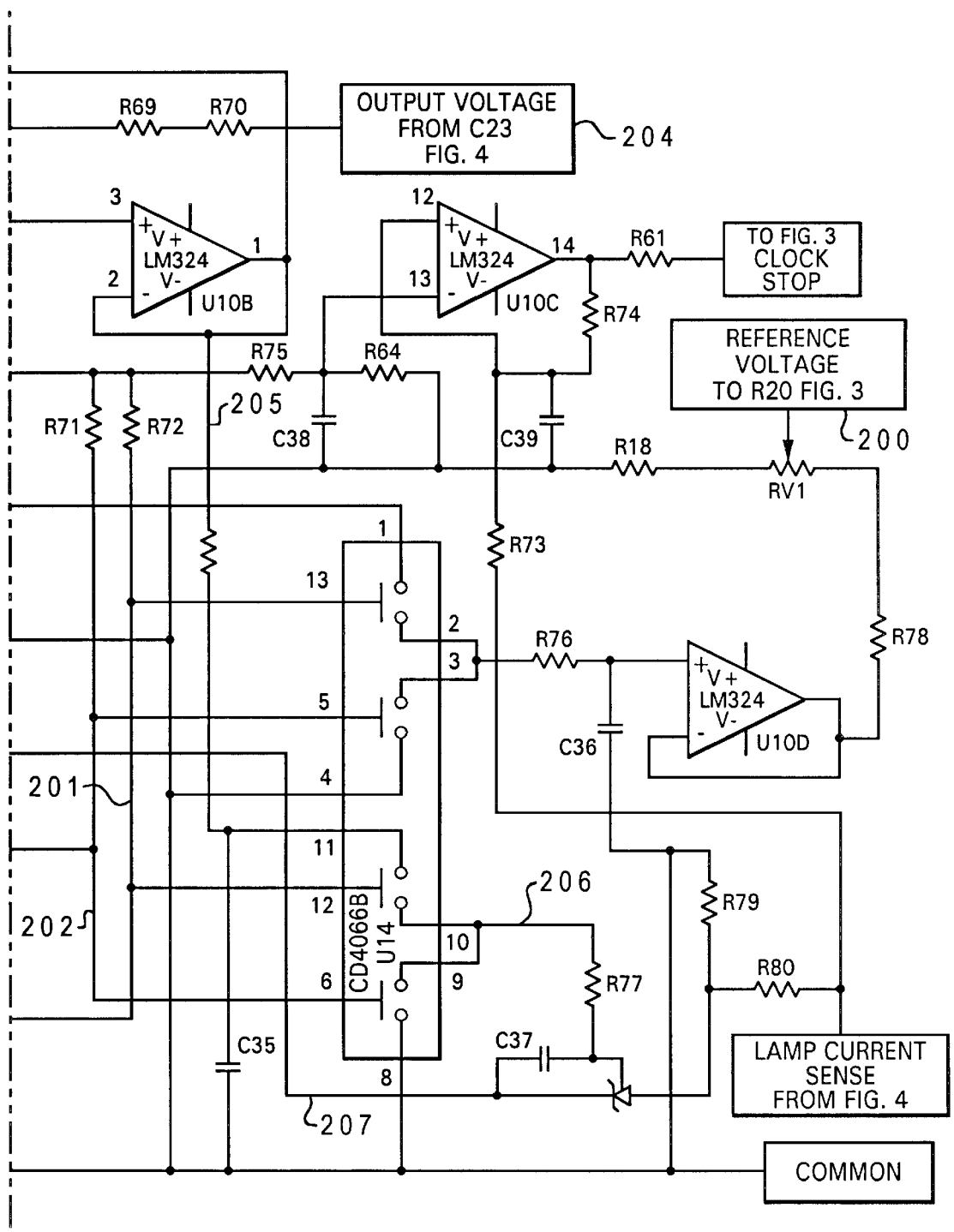

Now turning to FIGS. 3–5, they will be seen to be a schematic diagram of system circuits depicting the best mode known for carrying out the invention hereof.

In discussing FIGS. 3–5, the basic supply circuits, those which supply power and ignition voltages to the lamp, will first be described, followed by descriptions of the constant wattage regulating circuits, the timing/sequencing circuits and circuits which provide other features. FIG. 3 is a schematic of the main output control circuits including the U3 UC3846 control integrated circuit and components peripheral to it, which generate the drive pulses for the gates of the output transistors Q5 and Q6 of FIG. 4. The timing and sequencing circuits are also shown in FIG. 3.

FIG. 4 is a schematic diagram of the power portion of the circuits, where high level signals are handled. FIG. 5 depicts the constant wattage multiplier circuits where lamp operating voltage is monitored and the correct value for lamp current is computed.

Main output. With reference to FIG. 4, the output transformer T1 is driven by a pair of power MOSFET transistors, Q5 and Q6, which alternately switch the input power, that comes in from the boxes 101 and 102 labeled "24V INPUT". The input voltage is filtered by inductor L1 and capacitors C20 and C21 so as to minimize the amount of noise fed back out through the input line and so as to provide a low impedance voltage for the input to the system. The conduction time of Q5 and Q6, which conduct alternately, is pulse width modulated to adjust the amount of output that is produced.

The main output which supplies the power for sustaining lamp operation, is generated by the upper secondary 103 on output transformer T1 which, as shown, feeds a bridge rectifier comprising diodes D13–D16. The output of the bridge is a pulse width modulated voltage corresponding to the pulse width of the conduction of Q5 and Q6, and that voltage is averaged by inductor L3, resulting in an output voltage with a moderate ripple, component appearing at the top of capacitor C22. A fifth diode, D9, is connected across the output of the bridge to carry the current that is sustained by L3 during the times when the pulse width modulated output is at zero. An additional inductor, which has a small inductance value and is shown as L4, may be connected in series with the fifth diode D9 in some embodiments to soften the diode reverse recovery current spike of the diode and to reduce the amplitude of the ringing voltage that otherwise may appear at the input to L3 when the secondary voltage rises from zero at the beginning of each output pulse.

Boost output. A boost voltage is supplied by an additional secondary 104 on T1 which feeds a second bridge rectifier connected diodes D17–D20, the current to this bridge being limited to a low value by the impedance of an inductor L2 that is in series with the output of the secondary winding 104. Such boost voltage appears between points 105 and 106 which are at the tops of C22 and C23 respectively; and thus the sum of the main and boost output voltages appears at point 106 which is the top of capacitor C23. When load current flows in excess of the amount available from the current limited boost voltage source, the boost output is loaded down until the boost voltage becomes effectively zero, and the load current is then carried mainly by diode D21, to reduce the steady state voltage drop. The values of C22 and C23 are made as small as possible, consistent with adequate ripple reduction, to minimize the response time of the various current regulating mechanisms as herein before described.

Ignition voltage output. A high ignition voltage is generated in the secondary 107 of transformer T2 and is connected in series (as shown) between the output voltage at the top of C23 and the positive terminal 108 of the lamp that is to be powered by the system. This voltage is produced when the control signal from the timing circuit is applied through connection 109 to the right terminal 110 of R43, which forms a voltage divider in combination with R44 to reduce the voltage to a level that is just sufficient to cause the MOSFET Q7 to begin to conduct, whereupon oscillation begins. It should be noted that the high starting voltage can only be produced when the secondary of T2 is not heavily loaded by the current of the lamp, which is to say only before the lamp is ignited, due to the very limited current that can be generated by the ignition circuit and its own internal impedance. It is a useful property of this configuration that should the lamp current cease during the course of ignition, the oscillation will quickly re-start whenever the loading by the conducting lamp is removed, up to the time when oscillator bias voltage described above is removed by the timing and control circuits. This restarting action is shown graphically in FIG. 6.

Referring again to FIG. 6 it should be noted that it depicts a start-up at 100 percent power at high oscilloscopic sweep speed, with the trace representing lamp terminal voltage, and showing how the high voltage ignitor voltage can re-appear when the main direct current in the lamp begins to extinguish. Here, it re-appears six times before the lamp transitions into a stable arc mode, at 8.8 divisions on the time scale. At area 60 the high voltage from the ignitor has appeared. At point 61 the first lamp conduction has occurred, and at point 62 the lamp current has begun to spontaneously diminish due to the properties of the lamp being such that it is not yet ready to carry a sustained current. It is seen at point 62 that the high voltage has again started and is beginning to build up once again. At point 63 the voltage has increased sufficiently to re-strike the arc within the lamp, and at point 61*a* the lamp is once again in conduction. The current diminishment and re-striking occurs five more times, with the points in the graph being labeled similarly to those just described but with increasing values of alpha subscripts, until finally at point 61*f* lamp current is again established and the lamp is then in a state of readiness to continue conduction. At point 64 the final transition from glow to arc mode occurs and at point 65 the low voltage arc mode and the beginning of the temperature run up to full output has begun.

It also is an important aspect that if the lamp should extinguish spontaneously while operating in its normal mode, a standard starting sequence (as described below) is begun so as to re-start the lamp rather than leave the circuits in their normal operating mode.

Q7 is connected to primary winding 111 of transformer T2 so that the drain current passes through such winding. A feedback winding 112 is connected to capacitor C24 which in combination with C25 forms a voltage divider. C25 is in essentially in parallel with the gate-to-source capacitance of Q7, resulting in a division ratio somewhat greater than 2 to 1. The ignition circuit operates to produce the high voltage output when Q7 is biased to conduction and an oscillator circuit is formed similar to what has traditionally been called a Hartley oscillator. The division of voltage by C24 and C25 was found to be necessary to reduce the voltage fed back to the gate of Q7, since the feedback winding on the transformer has only one turn and can not be further reduced, and so that oscillation would always stop when the bias signal supplied to R43 through terminal 109 was removed by the timing circuits of FIG. 3. A resistor, R41, is connected in series with the source of Q7 to limit the current that can flow to the source, and thus to the drain, of MOSFET Q7.

This current limiting action in combination with the limited voltage that can appear at the gate of Q7 serves to limit the output current of the high voltage secondary 107 and protect the MOSFET Q7 from damage at times when the secondary is heavily shunted by the conduction of the lamp.

The use of a self-oscillating high voltage generator allows the circuit automatically to operate at the parallel resonant frequency of the High Voltage output circuit, where the resonating inductance is that of the secondary of the ignitor transformer T2, and the resonating capacitance is that of the lamp, the lamp holder, the wiring to the lamp holder, and the distributed capacitance of the secondary of the high voltage transformer T2. Since the values of the various capacitances external to the circuits hereof are subject to variation, and the resonant frequency is therefore subject to variation, it is less effective to drive the high voltage output driver transistor at a fixed frequency. When the circuit is permitted to establish the operating frequency at resonance, whatever that may be, (within reasonable limits centered around the aforementioned nominal frequency of about 100 kilohertz) the driving power required to attain a given voltage level is considerably less than it would be under some conditions with a fixed frequency drive.

In some designs of the high voltage transformer (e.g., transformer T2), it may be impractical to obtain a secondary inductance value that is sufficient to keep the resonant frequency within reasonable limits. In such designs, an additional fixed capacitor may be connected across a part of the secondary winding, from the low potential end to a tap (not shown) that will be provided on the winding for that purpose, so that the resonant frequency will be in a desired range.

It will now be seen that the total voltage that is presented to the lamp load is the sum of the main, boost, and ignitor voltages.

Main output control circuits. Control and regulation of the direct current portion of the output power of the system is accomplished through the use of a standard type UC 3846 current mode power supply control integrated circuit (FIG. 3). Such integrated circuit is well known in the electronic arts and reference is hereby made to suppliers' manuals, e.g., the manual "Product and Applications Handbook 1995–96 available from Unitrode Integrated Circuits Corporation of New Hampshire. However, for convenience, a brief simplified summary of its operation is here included so as to facilitate understanding of the ensuing system description.

As known to those skilled in the art, the UC3846 is a power supply control integrated circuit that operates in current mode. It contains a reference voltage regulator, a clock frequency oscillator, a pulse width control latch, a high speed comparator, a steering flip-flop, an operational amplifier for error correction, and two output driver circuits. The clock oscillator generates a master timing pulse, and can be operated over a wide range of frequencies at the discretion of the user. The output pulse from the oscillator sets the pulse width latch to the on state, and the output of the comparator resets the latch to the off state. The steering flip flop directs the pulse from the latch alternately to the two output drivers. The comparator inputs are connected to the output of the error operational amplifier and to a signal that is inputted to the integrated circuit from a sensing circuit that responds to the instantaneous current flowing in the power switching devices at any given moment. The comparator generates a latch reset pulse when the current sense signal equals the signal from the error amplifier. The error amplifier compares a reference voltage to the useful output of whatever system the integrated circuit is used in, and adjusts the signal to the comparator as required to correct the output to the desired value. In order for current mode control to occur, the current pulse that is presented to the aforementioned sensing circuit should have an amplitude value that increases during the time that the pulse exists, so that the maximum amplitude occurs at the time where pulse termination is desired.

The following description is directed to those parts of the circuit that are peripheral to the UC 3846 and which cause its operation to be modified as specifically required for use in the present system.

For the UC3846, pulse generation, current mode operation, MOSFET gate drive, current limiting, and input error signal amplification are normal operating modes as specified in the UC3846 data sheets. However, the way the analog input error signal is developed is deemed unique to the present system. Since it is one of the objects of the present system to supply a constant (but adjustable) wattage output to the load lamp, the error signal is developed as a function of the lamp current, as modified by another signal that is related to the operating voltage of the lamp in a manner that results in the delivery of a constant value of power (wattage) to the lamp regardless of how the voltage of the lamp may change. In FIG. 4, the resistor R45 carries the return current from the lamp, and a signal voltage is developed across R45 that is proportional to the lamp current.

Now returning to FIG. 3, the voltage developed across R45 is carried from terminal 120 through R13 which, in combination with capacitor C9, serves as a low pass filter to suppress noise, is applied to the left side of R15 and thence to the error amplifier inverting input terminal (package pin 6)of the UC3846. An adjustable reference voltage is supplied from the trim pot RV 1 in FIG. 5 through terminal 200 which adjusts the value of a reference voltage generated in a multiplier circuit as hereinafter described. The thus modified voltage is then passed through terminal 200' of FIG. 3 to R20 and thence to the non-inverting input (pin 5) of the UC3946 error amplifier. The action of the error amplifier, in combination with the other circuits in the UC3846, is to shorten the output pulse width and thereby reduce the main output whenever the voltage on the inverting input (pin 6) becomes more positive than the voltage on the non-inverting input (pin 5). The total effect is that the current supplied to the lamp is continuously adjusted so that the voltage returned from the current sense resistor R45 is essentially equal to whatever voltage is being fed in from the output of RV1. By appropriately setting RV1, the current output of the system as delivered to the lamp can be adjusted to a value that is related to a dimming control signal.

Current programming for constant wattage. Provision is herein made to adjust the output current regulating set point value as a function of the voltage existing across the lamp at any given time, so as to supply an adjustable (selectable) level of constant power, i.e., wattage, to the lamp that remains approximately constant (at the selected level) as the intrinsic operating voltage of the lamp varies from one lamp to another, as a given lamp ages, or with changes in lamp temperature.

Immediately after an arc lamp of the type contemplated herein is first ignited, the terminal voltage typically falls to a low value, on the order of 15 volts; and then as the temperature of the arc region within the lamp increases, the lamp terminal voltage likewise increases. After a period of time, the temperature will reach a stable operating point where the lamp is operating at a stable voltage level, which is generally in the range of 80 to 120 volts, depending on the specific type of lamp, its age, and the operating current level that has been chosen. It has been observed that in order to most reliably keep the lamp burning immediately after ignition, a current that is appreciably higher than the final steady operating current value should be supplied. This also has the effect of reducing the time required for the lamp to reach its final operating temperature; and, since the light output is also reduced until such operating temperature is attained, the time required to deliver normal full light output is also reduced. There is another consideration also that is addressed by the circuits herein: that as a lamp of the type here used is operated for an extended time, its terminal voltage gradually increases. It is a preferred operating condition that, as the voltage increase occurs over the useful life span of the lamp, that the current being fed to the lamp be decreased in order to maintain a relatively constant power. If this is not done, the wattage supplied to the lamp will increase as the lamp ages, eventually reaching a level at which there is a risk of a sudden explosive failure. The control system herein appears likely to reduce the probability of such an occurrence.

CONSTANT WATTAGE CONTROL WITH DIMMING INTERFACE

An advanced version of constant wattage control is included for use where optional dimming control by means of a variable DC input control voltage signal is desired. In facilitating this, the power in watts supplied to a lamp is maintained constant with respect to a dimming input control signal voltage supplied by an external controller (not shown). A conventional standard for such control input signal voltage is a voltage that varies between zero and positive ten volts DC, with maximum or 100 percent power occurring at the 10 volt level, and with the power being reduced to lower values that are linearly proportional to such control input signal voltage.

With reference to the previously described UC3846 circuit configuration, applied light output control is the reference voltage that was described above as being supplied from multiplier circuits (FIG. 5) and trimmed by adjustment pot RV1. To achieve dimming control, there is applied a voltage that is derived from the control input signal voltage, with such input signal voltage being modified by a multiplier circuit that senses the lamp operating voltage and multiplies the control input signal voltage by an appropriate factor such that the output power in watts becomes a linear function of the input control signal voltage.

Power control implementation. While there are various possible topologies that could be used to implement the foregoing principles, the following has been included in the circuits hereof and have been found to be the best known mode. In brief, the circuits monitor the lamp operating voltage and generate a multiplying factor such that when lamp operating voltage is multiplied by that factor, the result is a constant, fixed value. The same multiplying factor is applied to the dimming input control signal, and the resulting voltage is then attenuated by a fixed amount in the adjustment pot RV1 to become the reference input voltage to the UC3846 controller, all as hereinafter described. The setting of RV1 then determines the proportionality factor of control signal voltage to output power in watts. One advantage of this topology is that no time delays or phase shifts are added into the current control feedback loop, which is thus permitted to operate with the same speed as would be attained in normal fixed reference operation. There is no apparent loss in system performance caused by reasonable delays or phase shifts that may occur in the power correcting multipliers and associated circuits, since high speed is not essential to this part of the operation. Another advantage to this type of control is that the signals which are processed by the multipliers are relatively large in voltage, and are comparable in amplitude to each other, so that errors that may occur in those multipliers are similar and tend to cancel.

It should be noted that the aforementioned prior art references to constant power control circuits either leave details unspecified or describe circuits that produce a linear inverse relationship between lamp current and lamp voltage and do not achieve literal multiplication of signals. Such linear inverse relationship does not result in constant power being delivered to the load, but rather produces a power curve as a function of load voltage that has a maximum power at some middle value of voltage, and exhibits a very appreciable falling off of power level above and below the maximum point. Now turning to FIG. 5, it will be observed that the technique used for performing multiplication on a given voltage is that of switching alternately between the given voltage and the reference common by means of CMOS transmission gates contained in U14. These gates are driven alternately and series connected so as to form single pole double throw switches. The multiplication factor is determined by varying the duty cycle, which is to say, that portion of the time of each switching period during which the output is derived from the given voltage relative to the portion of time that the signal is referenced to common. As mentioned above, the CMOS switches are contained in U14 which is a standard CMOS component(part number CD4066B), described as a quad bilateral switch. Driving voltages to control the switches are generated by the four sections U11A–U11D of U11, which are connected as shown. The first section, U11A, is connected as a free running square wave/triangular wave oscillator. The triangular wave is produced at the top of capacitor C31, and that triangular wave is also applied to the inverting input of U11B. An analog voltage level which is produced at the cathode terminal of reference amplifier U13 as described below, is applied to the non-inverting input of that comparator U11B, with the result that the output of the comparator switches between high and low output states at the times when the triangular voltage passes through the value that is present on the analog input, thus creating a duty cycle that can be varied from zero to 100 percent and including all values in between.

A brief description of the reference amplifier, designated U13, may help to explain the operation of the overall circuit. U13 as employed here, is a type TL431 semiconductor device, which is designated by the manufacturer, Texas Instruments, as an "adjustable shunt regulator". The device contains within a small, low cost, three terminal package, the functions of a 2.5 volt reference voltage source, a high gain differential amplifier internally compensated for unity gain operation, and an open collector NPN transistor output stage. The inverting input of the amplifier is accessible as a package terminal, and the non-inverting input is internally connected to the reference voltage source. While designed primarily for use as a simple linear shunt voltage regulator, it is highly adaptable to a variety of circuit configurations. The curious terminal nomenclature, namely "anode", "reference", and "cathode", is borrowed from basic zener diode terminology to the extent that the anode and cathode terminals are analogous counterparts to the terminals of a zener diode, with the anode being the negative terminal and the cathode the positive terminal. As used in the TL431, what is called the cathode terminal is in reality the collector of the output transistor, while the so-called anode terminal is in fact the negative terminal that is common to both the reference voltage source and the current return of the output stage.

When a positive voltage is applied to the reference terminal relative to the anode terminal, and the voltage is less than the reference voltage value, only a small leakage current of less than one milliampere will flow into the cathode terminal, which must always be at least as positive as the reference terminal, and can be more positive if required. As the voltage on the reference terminal becomes very slightly greater than the reference voltage, a highly amplified current will begin to flow into the cathode terminal. For additional application data of the TL431, reference is hereby made to the manufacturer's data sheet.

The output of U11B is applied to the inverting input of U11C and the non-inverting input of U11D, with the other input of each being maintained at a steady voltage determined by the voltage divider formed by resistors R65 and R67. These latter comparators U11C and U11D each serve as buffer amplifiers to sharpen the waveform, and to provide two gate driving signals that are of opposite phase. This configuration achieves the desired result of producing two drive signals that have a short dead time, that is to say a short time when both outputs are low as one signal is switching from low to high and the other from high to low, so that there is no time when both the high and low switches in the double throw configuration are on at the same time. This is achieved by the proper selection of the comparitor output pull-up resistors R1 and R2 so as to provide adequate delay in the positive transition of each comparitor output voltage. Otherwise, such a condition would result in a very low impedance load being momentarily placed across the output of the voltage follower that supplies the analog input signal to the switch, this being an occurrence that would severely disturb the operation of the voltage follower and impair its accuracy. Even with this precaution, however, it has been found beneficial to the voltage follower operation to provide a noise filter in the form of a capacitor at the input to each of the bilateral switches from input to common, and then to provide isolation resistors between the capacitors and the output terminals of the respective operational amplifiers to avoid the instability that could occur when such an amplifier is used in the voltage follower connection and is used to drive into a capacitive load. Thus the operation is quite effective, while being implemented with just one quad amplifier package (U11A–U11D) of low cost, and a relatively few external components. The two driving signals thus created are then applied to the control inputs of the quad transmission gate U14 via conductors 201 and 202. Two duty cycle modulated double throw switches are thus formed, with the duty cycle of each switch identical to that of the other.

Control of the duty cycle, and thus the multiplication factor, is achieved as follows. The lamp operating voltage, labeled "output voltage from C23" (block 204), is monitored by dividing that voltage with a resistive voltage divider comprising R68 on the bottom and R69/R70 on the top, two resistors being used in order to avoid voltage overstress that could occur with just one. The resulting voltage is buffered by the operational amplifier voltage follower U10B, with the resulting output being fed via conductor 205 to the input of one of the switch pairs in U14. The output of that switch pair is applied via conductor 206 to R77 where, together with capacitor C37, it is integrated and then compared to a fixed reference voltage that is internal in the reference amplifier U13. The difference between the integrated voltage and the reference voltage is highly amplified within U13, and the result is applied back to the non-inverting input of comparator U11B via conductor 207.

Overall operation is achieved when the amplified difference signal causes a variation in the duty cycle of the drive that is applied to the analog switches, in the exact manner that is required to correct the voltage level that reaches the input of U13 until it very nearly equals the internal reference voltage of 2.5 volts that is present within U13.

The overall operation of the circuit thus far described is what may be described as a closed loop. As with any closed loop system, all parts of the loop must be active in order that any part may function as intended. In this instance, assuming that some arbitrary value of attenuated and buffered lamp voltage signal is coming from the output of the voltage follower U10B and is entering the CD4066 switch at pin 11; the multiplication factor (which is less than unity) that results from the operation of the switch will be whatever value is required to cause the averaged value of the switch output that is applied to the reference terminal of U13, to be very nearly equal to the internal reference in U13. The amplifier within U13 greatly increases the amplitude of the difference that exists between the averaged value signal and the internal reference, and the amplified difference appears at the cathode terminal of U13, which is the output terminal of the amplifier. That amplifier also acts as an integrator as a result of the presence of capacitor C37 which is effectively connected between the amplifier output and input. That amplifier output from U13 is then carried back to the non-inverting input of comparator U11B where it causes the duty cycle of the switches to be corrected to and maintained at the exact value that is required to create the necessary multiplication factor as described above in the beginning part of this paragraph. It is worthy of note that the useful output of the above described loop is the value of the switching duty cycle, which is coupled directly to a second pair of switches, as is considered in the following. Thus a closed loop is formed which automatically corrects the duty cycle, and therefore the multiplication factor, to the required value, with a high order of accuracy. In contrast with conventional analog multipliers, the circuits hereof exhibit improvements in linearity, stability and accuracy.

The two double pole switches are driven in unison and so have the same duty cycle, thus resulting in the same multiplying factor being applied to the signals that are processed by each such switch. The dimming control voltage input is applied to the non-inverting input of U10A which is connected as a voltage follower. The output of U10A is thus a buffered voltage equal to its input, which is then applied to the input of the other double throw switch in U14 where it is multiplied by the same factor that is applied to the lamp voltage signal. The multiplied voltage result is then integrated by R76 and C36, buffered by U10D, and applied to the voltage divider created by R78, RV1, and R18, so as to create the reference voltage that is supplied to the UC3846.

The value of lamp voltage for which the multiplier duty cycle becomes 100%, which is to say the multiplication becomes unity, can be chosen simply by selecting the appropriate ratio for the voltage divider consisting of R68 and R69+R70. When the lamp voltage is reduced until the output of the divider equal 2.5 volts or less, the multiplication factor will be at 100% since it is then attempting to supply the required 2.5 volts to the input of the TL431. This setting, in combination with the setting of the power ratio pot RV1, determines the maximum value of current that the regulator system will endeavor to provide to the lamp, since it serves to select the lowest value of lamp voltage for which constant wattage will be maintained.

There are certain conditions that require special control actions to ensure satisfactory operation of the lamp and protection of the power circuits in the ballast. These include the following.

Control signal limiter. In the present embodiment, the input control signal is limited to 10.0 volts by the circuit including U12 and associated components. This is done in order to limit the power that can be demanded of the ballast circuit to its rated value, and also to set the power level to the rated value when the dimming control input is not connected, at which time the input signal will be elevated to its limited value by current supplied through R81 (FIG. 5). This limiter also operates when the power boost during ignition or the lamp over voltage correction circuits described in the following sections, are operating. The output of U10A (FIG. 5) is voltage divided by resistors R62 and R63 and applied to the reference terminal input of U12. The ratio is chosen so that when the U10A output reaches 10.0 volts, U12 conducts and pulls down on the dimming signal line 208 through diode D26. A small current supplied through R12 keeps the cathode terminal of U12 supplied with whatever leakage current that the U12 may exhibit, and ensures that D7 is reverse biased except when limiting is required, so that the accuracy of normal operation is not impaired.

Power boost during ignition. If starting of the lamp is attempted when the dimming control voltage input signal is set to a low power setting, some individual lamps may not start, but may instead quickly extinguish as soon as the ignitor operation stops. To avoid this problem, the ignitor bias signal from the timing circuits is also employed in the dimming circuit to boost the power setting to 100 percent for the duration of ignitor operation. With reference to FIG. 5, such ignitor bias signal is applied (through terminal 210) to the base of transistor Q10 which operates as an emitter follower to supply current through D25 and R54 to pin 5 of U10A, where it raises the level of the control voltage on line 208.

Figure 7:
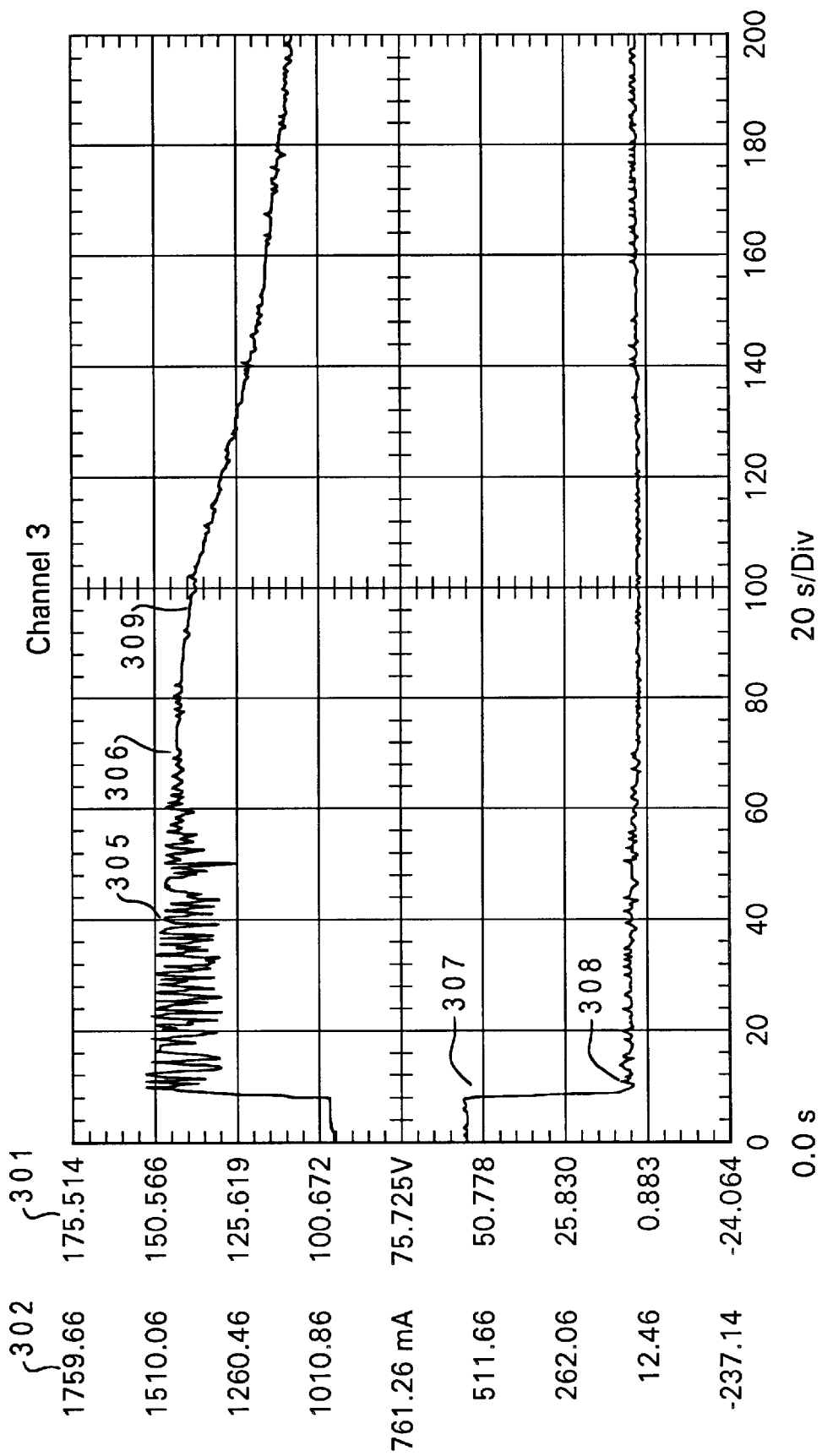
FIG. 7 is a graph depicting actual voltage and current values following reduction of power levels from 100% to 10%, and illustrating control of lamp voltage to prevent excessive levels.

Lamp over voltage correction. If a lamp has been operating at substantial power for a sufficient time to become well heated, and the dimmer setting is suddenly reduced to the minimum level, the lamp tends to exhibit an abnormally high arc voltage requirement until the internal temperature has fallen to a lower value. This requirement can easily exceed the voltage capability of the ballast output circuits, in which case the lamp will extinguish. To avoid this occurrence, a circuit is included which temporarily raises the power setting to whatever level may be required to prevent the lamp arc voltage from exceeding approximately 140 volts until sufficient time has elapsed for the lamp to cool to a temperature that is normal for low power operation. The buffered and attenuated lamp voltage signal that is the output of U10B is carried through D24 and R58 to the emitter of Q11. The base of Q11 is maintained at a fixed bias voltage by the voltage divider R50 and R59. When the output of U10B becomes sufficiently high to inject current to the emitter of Q11, such current appears at the collector 212 of the transistor Q11 and flows into pin 5 of U10A, raising the power setting as needed. Action of the power modifier circuits to limit voltage from exceeding 140 to 150 volts by temporarily boosting the power setting is illustrated by FIG. 7. There, it will be observed is a graph of voltage and current versus time, the values of voltage those of the inner schedule 301, and the values of current being those of the outer schedule 302. At time equals 10 seconds, the power setting is changed from 100 percent to 10, with the result that lamp voltage rises from just under 100 to about 140–150 volt range where it tends to exhibit a very rapid oscillatory modulated trace 305 which continues until it decays to an essentially steady trace at point 306. Concurrently, the current drops from about 525 milliamperes (point 307) to about 90 milliamperes (point 308) whence it varies slightly in response to the operation of the lamp over voltage correction circuit, with a small increase during the first 60 seconds following the power reduction. Thus, the power modifier prevents lamp voltage from rising excessively during the time when the lamp temperature is still much higher than what it would be at an equilibrium temperature at the reduced power level.

Further reference to FIG. 7 reveals that at about point 309, the lamp voltage begins to fall as the lamp cools and as the lamp moves toward equilibrium in its wattage regulating mode. It will thus be evident that without the aforementioned power modifier, the lamp voltage could increase to a level where the ballast circuits could no longer sustain the conduction of current through the lamp.

SYSTEM CONTROL AND TIMING

The timing and control functions as previously described are implemented with CMOS logic integrated circuits and peripheral circuitry. For a consideration of such, reference is now made to FIG. 3.

Principle of operation. The aforementioned operation control input from the low level control system is an input to timing circuits comprising U2 CD4020B, U1 CD4093B, and the several resistors, diodes, and capacitors associated therewith. Outputs from the timing and control circuits enable the operation of the aforementioned main output power converter and the high voltage ignitor circuit; and to accomplish this, a low voltage DC output is supplied to power U3, the UC3846 pulse width modulation control circuit.

The latter is turned off by the timing circuits during times when the ballast is held in a non-operating state by the above-described low level control input, or when the timing sequence has gone into waiting mode, thus reducing the standby current drain on the 24 volt DC input. Timing intervals are established by U2, the CD4020B which, as described below, includes a 14 stage binary counter circuit that counts pulses generated by an oscillator circuit, such oscillator circuit comprising gate 1 and gate 2 (two) of the four Schmitt trigger NAND gates 212–215 that are contained in the upper and lower illustrated parts 216a and 216b of U1, the CD4093. The various counter stage buffered outputs of U2 are used in the peripheral circuits, which include the other two gates 3 and 4 in U1 and related circuits as hereinafter described, to control the actions of the system. U4, an integrated three terminal low power voltage regulator type LM78L15, is also included to provide a stable operating supply voltage for the timing circuits and also for the UC3846, by virtue of the driving voltage to the base of Q2 being limited to the value of output of U4.

TIMING SEQUENCE.

To facilitate understanding of circuit operation without requiring reference to part specifications, operating characteristics of the CMOS logic parts are summarized as follows. The terms "high" and "low" are used in indicating the voltage level at a given circuit point. The term "high" indicates that the voltage is close to the supply level, called VDD. The term "low" indicates that the voltage is close to common or ground potential. U1, the CD4093, contains four logic gates 212–215 of the type known as NAND gates. The action of such gates is such that the output will be high unless both of the inputs are high, when, and only then, the output will become low. In addition, the gates in U1 have a triggering action such that if an input voltage is changed from low to high or high to low, even though the change may be occurring relatively slowly, the output transition will occur very rapidly at one discrete value of input voltage, such discrete value being different depending on whether the input transition is in a positive direction or a negative direction.

U2 contains a 14 stage binary counter with buffered outputs on all but a few of the least significant stages. The state of the counter is advanced by one count each time the state of the input terminal at pin 10 changes from high to low. All stages are reset to the output (low) condition when the reset input on pin 11 is driven high. The notations within the box that symbolize the counter circuit include multiple designations that begin with the letter Q. These are the designations that were chosen by the manufacturer of the CD4020 to refer to counter stage outputs, as for example, Q6 is the output of the 6th stage, and Q14 is the output of the 14th and last stage. Hereinafter, reference to these Q numbers will be preceded by the words "counter output" to avoid possible confusion with the schematic reference numbers for transistors, which also begin with the letter Q.

Initial reset. The timing operation is initiated when the U2 (CD4020B) is reset to the all zeros state by a high signal on its reset input at pin 11 (designated "R"), and is then subsequently released by lowering the reset input. Reset action is caused by either of two conditions: First, bringing the operation control input 217 to a low level, which is the signal for turn off of the ballast, causes the output of GATE 3 to go high, that output being connected directly to the reset input of the CD4020 via conductor 218. Second, if the 24 volt input power to the system is initially applied, and the operation control input is either high or not connected, the voltage at the VCC regulator input 219 does not rise instantly, but has some finite rise time. As the voltage is increasing, the output of U4 (the LM78L15 regulator) increases with it until the regulating set point voltage of the regulator is attained, at which point the output remains steady. As the input voltage continues to increase, a current begins to flow through R5 to the emitter of Q1, whose base is then being maintained at the regulator output voltage. The emitter current appears as collector current of Q1 which begins to raise the voltage on R7, which is also connected via conductor 220 to the other input of GATE 3. As long as the input to GATE 3 is low, the output of GATE 3 is high so that U2 (the CD4020) is started up in a reset condition; but when the input DC voltage becomes sufficiently high for the collector current of Q1 to bring the GATE 3 input high, the gate output goes low and the operation of U2 (the CD40240) is enabled.

Under voltage lockout. A second function that is closely related to that of the preceding paragraph is the lockout of all functions when the system input power voltage becomes too low for proper operation. When the output of GATE 3 is high as described in the preceding paragraph, and when the input power supply voltage is below the operating range, a current is passed through D2 and raises the inputs of GATE 4 to a high state. The output of GATE 4 then assumes the low state, which removes the supply voltage from U3 and thus shuts down the main output.

Timing oscillator. GATE 1 and GATE 2 in U1 are interconnected as an oscillator, in which the frequency is determined by the time constant of R8 and C7. In the present instance and in the ensuing description, the oscillator frequency is considered to be 50 pulses per second, so that the actual time in seconds at any given count number in the sequence is that number divided by 50. However it will be evident to those skilled in the art that other frequencies may be employed in practicing the principles of the invention. In such event the time in seconds will be the given count number divided by the frequency in pulses per second. Thus it will be seen that the timing functions are related to the clock frequency and vary as the frequency is changed.

As shown in the drawing, the output of the oscillator is connected to the pulse input of U2 (the CD4020) at pin 10. During normal continuous lamp operation, the oscillator operation is stopped and the CD4020 remains at a fixed count position. Two methods are used for stopping oscillation. First, the anode of D1 can be driven high thus holding both inputs of GATE 1 high and preventing oscillation. Second, if input 2 of GATE 2 at pin 6 is driven low by the output of GATE 4 under conditions as hereinafter described, GATE 2 becomes unresponsive to the signal on input 1 and oscillation is prevented.

Basic circuit function. At this point, a discussion of two circuits may be helpful in the description that follows. First, the operation of the high voltage ignitor is controlled by an ignitor bias voltage produced at the collector of Q3, attenuated by resistors R43 and R44, and applied to the gate of the high voltage oscillator MOSFET Q7 as shown in FIG. 4. When that bias voltage goes to the logic high level, the high voltage oscillator is enabled to run. That bias is produced when any one or combination of the outputs on pins 4, 6, and 13 of the aforementioned counter in U2 (FIG. 3) go to the high state. For example, if counter output Q7 on pin 6 goes high, the anode of D6 is driven high, and a current passes through D6 and thence through R14 to the collector of Q3. The other diodes D5 and D7 together with D6 form a wired "OR" logic, in which any of the three inputs to those three diodes can produce the same output on conductor 221. At a later time in the sequence when it is required that the ignitor bias voltage be removed, the base of Q3 is driven to cause Q3 to conduct, thus lowering the bias signal to near ground potential. R14 limits the current that can be drawn from the outputs of the U2 CD4020 under this condition. Drive for the base of Q3 is produced when any one or combination of pins 1, 12, 14, and 15, of the U2 CD4020 go high.

The main output is disabled by supplying a small positive voltage to pin 16 of the U3 UC3846 pulse width modulation (PWM) controller. Such positive voltage is produced when any one or combination of U2 pins 1,14, and 15, assume the high output state. Resistors R27, R28, and R29, are connected in another form of wired "OR" logic configuration, which is useful when the output voltage of the combination remains at a relatively low value even when it is being driven, as is the case with pin 16 of the UC3846 and also with the bipolar transistor base of Q3.

Sequence of operations. When the output of GATE 3 goes low as described above, the U2 CD4020 counter becomes responsive to pulses from the timing oscillator, which may already be running, and counting begins starting from zero. The main inverter, with output produced by the secondaries of transformer T1, will also be running, since none of the CD4020 outputs that turn off the main output will be high at this point in the count. When the count reaches the value that causes pin 4 to go high, the value being 32 pulses, bias is supplied to the ignitor oscillator as a current through D5 and R14, through the box 109a labeled "to FIG. 2 ignitor bias" and then through block 109 and R43 in FIG. 4. Bias is maintained as long as any one or combination of pins 4, 6 and 13 is high, and until transistor Q3 is caused to conduct as previously described. The count continues until the counter output Q9 on pin 12 goes high at 256 pulses, at which time the cathode of D8 is also caused to go high. Prior to this, the anode of D8 has been held low by the conduction of D8 and thus the clock stop line from FIG. 5 and the anode of D1 have been likewise held low. In a preceding section it was described how driving the anode of D1 high causes the timing oscillator to stop.

When D8 cathode is high, stopping of the clock will not occur unless the clock stop line is also being driven high by the output of amplifier U10C in FIG. 5. This condition only occurs when lamp current has been established, and a positive signal obtained from the voltage drop across R45 in FIG. 4 results from the passage of lamp current. Such positive signal is conducted to the non-inverting input of U10C (as shown), after passing through a low pass filter comprising R73 and C39. When the positive signal becomes greater than the small positive fixed bias that is supplied to the inverting input by the voltage divider R75–R64, the output of U10C goes high and will stop the clock oscillator when permitted to do so by a high state of counter output Q9 in U2.

The overall effect is then as follows. When the count reaches 256 (5.12 seconds), CD4020 pin 12 goes high, pins 4, 6, and 13 having all just gone low, the high voltage oscillator bias will be removed, causing oscillation to stop. At this point a decision is made by the circuits. If lamp current has been established, the count is halted at that point, and the ballast is allowed to continue to operate. If lamp current has not been established, the count is allowed to continue until counter output Q10 on pin 14 goes high at 512 counts, at which time the main output is turned off. The count is allowed to continue, with both the main output and the ignitor remaining turned off, until counter output Q13 on pin 2 goes high at 4096 counts (81.92 seconds) and pins 1, 14, and 15 all go low. At this point the main output is again allowed to turn on, and 32 counts later the ignitor is again caused to operate. From this point the entire sequence is repeated as described above, performing a second attempt to start the lamp.

Waiting mode. When the starting attempt has been executed according to the foregoing cycle a total of 4 times, counter outputs Q13 and Q14 on pins 2 and 3 will have already gone high at a total count of 12,288, and when counter output Q11 on pin 15 once again goes high at a count of 13,312, the diode and resistor wired AND function provided by D11, D12, and R32, will cause the anode of D3 to go high which in turn drives both inputs of GATE 4 high. The resulting low at the output of GATE 4 stops the timing oscillator as previously explained, and lowers the base of Q2, thereby removing the supply voltage from U3 UC3846. The circuits will remain in this mode indefinitely until a reset is generated, either by cycling the input main system supply voltage off and on, or by cycling the operation control input to off and back to on, at which time the starting attempt sequence will be re-initiated and up to four more starting attempts will be made.

It will now be evident that there has been described herein an improved and highly versatile system in which provision is made for extensive variances in lamp characteristics, and in which starting and control is substantially facilitated.

Although the inventions hereof have been described by way of a preferred embodiment, it will be evident that many adaptations and modifications may be employed without departing from the spirit and scope thereof. For example, lamps of different types and ratings may be employed; or a source of supply voltage other than 24 Volts DC may be employed.

The terms and expressions employed herein have been used as terms of description and not of limitation; and thus, there is no intent of excluding equivalents, but on the contrary it is intended to cover any and all equivalents that may be employed without departing from the spirit and scope of the inventions.

What is claimed is:

1. A ballast for a direct current high intensity arc discharge lamp comprising:
    (a) starting circuits having an output producing high frequency alternating current starting voltage of at least ten times the nominal voltage of said lamp;
    (b) operating circuits including a source of direct current lamp energizing power interconnected with said lamp for providing operating power for energizing said lamp, said starting circuits and said source of direct current lamp energizing power being effectively connected in series;
    (c) control circuits interconnected with said starting and operating circuits;
    (d) means including said starting circuits for establishing an operating arc within said lamp;
    (e) means for monitoring levels of voltage and current through said arc; and
    (f) control means responsive to said voltage and current through said arc for maintaining the product of said voltage and said current substantially constant at predetermined selectable wattage levels.

2. A ballast for a direct current high intensity arc discharge lamp according to claim 1 wherein said frequency is within a range of from about 80 to 120 kilohertz.

3. A ballast according to claim 1 further including a dimming input adjustable control signal reference voltage, and wherein said control means includes means for multiplying said adjustable control signal reference voltage by a function of said voltage through said arc to produce a modified adjustable reference voltage.

4. A ballast according to claim 3 wherein said control means further includes resistor means for producing a lamp current-representing voltage.

5. A ballast according to claim 4 wherein said control means further includes comparison means for comparing said modified adjustable reference voltage with said lamp current-representing voltage and for producing an amplified product of the difference between said modified adjustable reference voltage and said lamp current-representing voltage.

6. A ballast according to claim 5 wherein said control means further includes a pair of alternately coordinated single pole double throw switches.

7. A ballast according to claim 6 wherein said control means further includes means responsive to said amplified product for proportionately changing duty cycles of operation of said single pole double throw switches, thereby correspondingly effectively changing multiplication of said adjustable control signal reference voltage to produce a linear relationship between said input adjustable control signal reference voltage and said predetermined selectable wattage levels.

8. The ballast according to claim 1 wherein said control means includes means for dimming said lamp.

9. The ballast according to claim 8 wherein said operating circuits include a pulse width modulated power supply and means for supplying variable width pulses to said pulse width modulated power supply.

10. The ballast according to claim 9 wherein said control means includes means for varying widths of said variable width pulses.

11. The ballast according to claim 10 wherein said control means includes means for continuous monitoring of said pulses and when current in said pulses reaches predetermined selectable values, for terminating said pulses.

12. The ballast according to claim 11 wherein said control means further includes inductor means for current leveling.

13. The ballast according to claim 8 wherein said means for dimming said lamp includes means for changing said predetermined selectable wattage levels.

14. The ballast according to claim 1 wherein said operating circuits include a pulse width modulated power supply and means for supplying variable width pulses to said power supply.

15. The ballast according to claim 14 wherein said control means includes means for varying widths of said variable width pulses.

16. The ballast according to claim 1 further including means effective when said arc is established and stable for rendering said starting voltage essentially ineffective.

17. The ballast according to claim 16 wherein said means for rendering said starting voltage essentially ineffective principally includes low current capacity within said starting circuits.

18. The ballast according to claim 17 wherein said means for rendering said starting voltage essentially ineffective essentially consists of low current capacity within said starting circuits.

19. The ballast according to claim 1 wherein said control means includes means for selectively setting said wattage levels within a range of from about ten percent to 100 percent of rated maximum power input to said lamp.

20. The ballast according to claim 19 further including compensating means compensating for changes in voltage-current characteristics of said lamp occurring with aging of said lamp.

21. The ballast according to claim 1 wherein said starting circuits include counting and control means effective upon starting said lamp for defining predetermined timing intervals for applying said high frequency alternating current starting voltage and operating current to said lamp.

22. The ballast according to claim 21 wherein said predetermined timing intervals include a predetermined starting sequence comprising:

(a) a starting signal;

(b) a first interval following said starting signal, said first interval defining a period of time for supplying main power and d-c boost lamp voltages to said lamp;

(c) a second interval defining a period of time for application of an ignitor signal to said lamp and setting said lamp to full power;

(d) a third interval immediately following said first interval, said third interval defining a period of time for setting lamp operating power to a predetermined level; and (e) a fourth interval immediately following said third interval, said fourth interval defining a period of time during which:

(i) if normal lamp arc current is in progress, said timing intervals pause; and (ii) if normal lamp current is not in progress, said timing intervals continue to provide a period of time during which main output current supply to the lamp is turned off.

23. The ballast according to claim 22 wherein durations of said time intervals are about one half second for said first interval, about five seconds for said second interval, and about five seconds for said third interval.

24. The ballast according to claim 22 further including means responsive to a spontaneous extinguishment of said lamp for automatically re-initiating said predetermined sequence.

25. The ballast according to claim 22 further including means for repetitively cycling said ballast through said starting sequence.

26. The ballast according to claim 1 wherein said control means includes means for controlling and adjusting values of current supplied to said lamp.

27. The ballast according to claim 26 wherein said operating circuits further include means for supplying boost voltage to boost output of said operating circuits when in an open circuit condition to a value of more than twice a steady state operating voltage of said lamp.

28. The ballast according to claim 1 wherein said operating circuits further include means for supplying boost voltage to boost output of said operating circuits when in an open circuit condition to a value of more than twice a steady state operating voltage of said lamp.

29. A ballast for a direct current high intensity arc discharge lamp comprising:

(a) starting circuits having an output producing high frequency alternating current starting voltage of at least several times the nominal voltage of said lamp, said frequency being in a range of from about 80 to 120 kilohertz, said starting circuits further including:
  (i) means for establishing an operating arc within said lamp;
  (ii) means for automatically rendering said starting voltage essentially ineffective as soon as said arc is established, and
  (iii) counting means effective upon starting said lamp for defining predetermined timing intervals for applying operating current and said high frequency alternating current starting voltage to said lamp;
(b) operating circuits including a source of direct current lamp energizing power interconnected with said lamp for providing operating power for energizing said lamp, said starting circuits and said source of direct current lamp energizing power being effectively connected in series; said operating circuits including:
  (i) a pulse width modulated power supply;
  (ii) means for supplying variable width pulses to said power supply; and
  (iii) means for supplying boost voltage to boost output of said operating circuits when in an open circuit condition to a value of more than twice a steady state operating voltage of said lamp;
(c) control circuits interconnected with said starting and operating circuits;
(d) means for monitoring levels of voltage and current through said arc; and
(e) control means, including means for varying widths of said variable width pulses, responsive to said voltage and current through said arc for maintaining the product of said voltage and said current through said arc substantially constant at predetermined selectable wattage levels, said wattage levels being selectable within a range of from about 10 to 100 percent of rated maximum power input to said lamp.

30. The ballast according to claim 29 wherein said timing intervals include:
  (a) an initial interval following a starting signal;
  (b) a second interval immediately following said initial interval, said second interval defining a period of time for application of an ignitor signal to said lamp;
  (c) a third interval immediately following said second interval, said third interval defining a period of time for setting lamp operating power to a predetermined level;
  (d) a fourth interval immediately following said third level, said fourth level defining a period of time during which:
    (i) if normal lamp arc current is in progress, said timing intervals pause; and
    (ii) if normal lamp current is not in progress, said timing intervals continue to provide a fifth level defining a period of time during which main output current supply to the lamp is turned off.

31. The ballast according to claim 30 wherein durations of said time intervals are about one half second for said first interval, about five seconds for said second interval, and about five seconds for said third interval.

32. The ballast according to claim 30 further including means responsive to a spontaneous extinguishment of said lamp for automatically re-initiating said predetermined sequence.

33. The ballast according to claim 30 further including means for repetitively cycling said ballast through said starting sequence.

34. The ballast according to claim 29 wherein said control means includes means for dimming said lamp.

35. The ballast according to claim 34 wherein said means for dimming said lamp includes means for changing said predetermined selectable wattage levels.

36. The ballast according to claim 29 wherein said control means includes means for continuously monitoring said pulses and when current in said pulses reaches predetermined selectable values, for terminating said pulses.

37. The ballast according to claim 36 wherein said control means further includes inductor means for current leveling.

38. The ballast according to claim 29 wherein said means for rendering said starting voltage essentially ineffective principally includes low current capacity within said starting circuits.

39. A lighting system comprising:
  (a) a high intensity discharge lamp;
  (b) a source of electric power; and
  (c) a ballast according to claim 1 interconnecting said high intensity discharge lamp with said source of electric power.

40. The lighting system according of claim 39 wherein said starting circuits include counting and control means effective upon starting said lamp for defining predetermined timing intervals for applying said high frequency alternating current starting voltage and operating current to said lamp, said timing intervals including a predetermined starting sequence comprising:
  (a) a starting signal;
  (b) a first interval following said starting signal, said first interval being of about one-half second for supplying main power and d-c boost lamp voltages to said lamp;
  (c) a second interval of about five seconds following said first interval for application of an ignitor signal to said lamp and setting said lamp to full power;
  (c) a third interval of about five seconds immediately following said second interval, said third interval defining a period of time for setting lamp operating power to a predetermined level;
  (d) a fourth interval immediately following said third interval, said fourth interval defining a period of time during which:
    (i) if normal lamp arc current is in progress, said timing intervals pause; and
    (ii) if normal lamp current is not in progress, said timing intervals continue to provide an additional interval defining a period of time during which main output current supply to the lamp is turned off.

41. The lighting system according to claim 40 further including means responsive to a spontaneous extinguishment of said lamp for automatically re-initiating said predetermined sequence.

42. The lighting system according to claim 41 further including means for repetitively cycling said ballast through said starting sequence.

43. A lighting system comprising:
  (a) a high intensity discharge lamp;
  (b) a source of electric power; and
  (c) a ballast according to claim 29 interconnecting said high intensity discharge lamp with said source of electric power.

44. A lighting system including:
  (a) a direct current high intensity arc discharge lamp;
  (b) means for supplying electric power to said system;
  (c) starting circuits interconnected with said lamp, said starting circuits having an output producing high frequency alternating current starting voltage of at least several times the nominal voltage of said lamp, said frequency being in a range of from about 80 to 120 kilohertz;

(d) operating circuits including a source of direct current lamp energizing power interconnected with said lamp for providing operating power for energizing said lamp, said starting circuits and said source of direct current lamp energizing power being connected in series;

(e) control circuits interconnected with said starting and operating circuits;

(f) means including said starting circuits for establishing an operating arc within said lamp;

(g) means for monitoring levels of voltage and current through said arc; and (h) control means responsive to said voltage and current through said arc for maintaining the product of said voltage and said current substantially constant at predetermined selectable levels within a range of from about 10 percent to about 100 percent of lamp rated power.

45. The lighting system according to claim 44 wherein said lamp is metal halide.

46. The lighting system according to claim 44 wherein said lamp is a high intensity arc discharge lamp selected from a group consisting of metal halide, mercury vapor and sodium vapor lamps.

47. A method of starting, controlling and operating a high intensity gaseous arc discharge lamp comprising:

(a) developing a high frequency alternating current starting voltage having a predetermined minimal current supply capacity;

(b) producing sustaining current for sustaining an arc discharge within said lamp after said arc is established within said lamp, said sustaining current capacity being at least twice the current capability of said minimal current supply capacity;

(c) applying said starting voltage to said lamp to initiate said arc within said lamp;

(d) applying said sustaining current to said lamp for stabilizing and sustaining said arc discharge within said lamp;

(e) rendering ineffective said starting voltage when said arc discharge is stabilized;

(f) varying said sustaining current to maintain power consumed by said lamp at any of a plurality of predetermined constant values; and (g) changing said predetermined constant values to produce correspondingly changing constant light output values from said lamp.

48. The method of claim 47 wherein said step of varying said sustaining current includes a step of creating current pulses of variable widths.

49. The method of claim 48 further including a step of varying said current pulses of variable widths.

50. The method of claim 47 further including a step of automatically re-applying said starting voltage to said lamp to re-initiate said arc within said lamp when said arc of said lamp spontaneously extinguishes.

51. The method of claim 47 further including supplying a boost voltage to increase normal operating voltage to about twice its normal value when said arc is not struck.

52. The method of claim 48 wherein said step of varying said sustaining current to maintain power consumed by said lamp at any of a plurality of predetermined constant values includes setting a range of said constant values between 10 and 100 percent of rated light output of said lamp.

53. The method of claim 52 wherein said step of varying said sustaining current to maintain power consumed by said lamp includes a step of creating current pulses of variable widths.

54. The method of claim 53 further including a step of varying said current pulses of variable widths.

55. The method of claim 47 further including monitoring arc voltage and current of said lamp.

56. The method of claim 55 further including responding to changes in voltage-current characteristics of said lamp as said lamp ages by correspondingly changing voltage and current supplied to said lamp to compensate for said changes in said voltage-current characteristics of said lamp.

57. The method of claim 56 wherein said step of varying said sustaining current to maintain power consumed by said lamp at any of a plurality of predetermined constant values includes setting a range of said constant values between 10 and 100 percent of rated light output of said lamp.

58. The method of claim 56 further including steps of creating and controllably varying current pulses of variable widths.

59. The method of claim 55 further including:

(a) producing and buffering an attenuated voltage linearly related to said arc voltage;

(b) providing variable multiplication of said attenuated voltage to produce a multiplied voltage;

(c) adjusting said variable multiplication to maintain said multiplied voltage in predetermined relationship to operating wattage of said lamp;

(d) providing an adjustable dimming control signal voltage for controllably dimming said lamp;

(e) multiplying said dimming control signal voltage by said variable multiplication; and (f) varying said arc current to maintain power of said lamp at a constant wattage level representing said adjustable dimming control signal voltage.

60. The method according to claim 59 wherein adjusting said variable multiplication to maintain said multiplied voltage in predetermined relationship to operating wattage of said lamp includes maintaining said multiplied voltage in linear relationship to said operating wattage of said lamp.

* * * * *